US008614957B2

(12) United States Patent
Hattori et al.

(10) Patent No.: US 8,614,957 B2
(45) Date of Patent: Dec. 24, 2013

(54) EXTENSION CONNECTION METHOD AND ROUTE SELECTION DEVICE

(75) Inventors: Reiko Hattori, Kawasaki (JP); Takeshi Kunugi, Kawasaki (JP); Tadashi Yamada, Kawasaki (JP); Takeshi Masubuchi, Kawasaki (JP); Kenichiro Aoyagi, Yokosuka (JP); Yasuhiro Kawabe, Yokosuka (JP)

(73) Assignees: Fujitsu Limited, Kawasaki (JP); NTT DoCoMo, Inc., Tokyo (JP)

(*) Notice: Subject to any disclaimer, the term of this patent is extended or adjusted under 35 U.S.C. 154(b) by 763 days.

(21) Appl. No.: 12/572,076

(22) Filed: Oct. 1, 2009

(65) Prior Publication Data

US 2010/0085896 A1 Apr. 8, 2010

(30) Foreign Application Priority Data

Oct. 8, 2008 (JP) .................. 2008-261857

(51) Int. Cl.
*H04J 3/14* (2006.01)

(52) U.S. Cl.
USPC ............ 370/248; 370/329; 370/353; 370/354

(58) Field of Classification Search
USPC .................. 370/254, 328, 329, 352, 353, 354, 370/248
See application file for complete search history.

(56) References Cited

U.S. PATENT DOCUMENTS

| | | | | |
|---|---|---|---|---|
| 5,715,304 A * | 2/1998 | Nishida et al. | ............ | 379/114.02 |
| 5,875,234 A * | 2/1999 | Clayton et al. | ............. | 379/93.05 |
| 6,289,096 B1 * | 9/2001 | Suzuki | ...................... | 379/221.01 |
| 6,366,560 B1 * | 4/2002 | Ohiwane et al. | ............... | 370/238 |
| 6,385,191 B1 * | 5/2002 | Coffman et al. | ............... | 370/352 |
| 6,981,022 B2 * | 12/2005 | Boundy | ......................... | 709/204 |
| 7,206,582 B2 * | 4/2007 | Tom et al. | ...................... | 455/445 |
| 7,634,293 B2 * | 12/2009 | Masuda et al. | ............. | 455/552.1 |
| 7,860,505 B2 * | 12/2010 | Yamada et al. | ................ | 455/445 |
| 7,885,208 B2 * | 2/2011 | Mutikainen et al. | ........... | 370/260 |

(Continued)

FOREIGN PATENT DOCUMENTS

| | | |
|---|---|---|
| EP | 0 462 727 A2 | 12/1991 |
| JP | 2001-503578 | 3/2001 |

(Continued)

OTHER PUBLICATIONS

European Search Report dated Jan. 14, 2010 issued in corresponding European Patent Application 09172000.3.

(Continued)

*Primary Examiner* — Brian O'Connor
(74) *Attorney, Agent, or Firm* — Staas & Halsey LLP

(57) ABSTRACT

When receiving an extension connection request from a first mobile terminal, a first route selection device selects a first extension connection route from among a plurality of extension connection routes and transmits the type of the first extension connection route and calling-side address information used on the first extension connection route to a second route selection device. The second route selection device selects a second extension connection route from among the plurality of extension connection routes and transmits the type of the second extension connection route and called-side address information used on the second extension connection route to the first route selection device. If the second extension connection route coincides with the first extension connection route, an extension connection is established between the first mobile terminal and the second mobile terminal via the first extension connection route.

6 Claims, 40 Drawing Sheets

(56) References Cited

U.S. PATENT DOCUMENTS

| | | | |
|---|---|---|---|
| 8,102,839 B2 * | 1/2012 | Kuusinen et al. | 370/352 |
| 8,111,664 B2 * | 2/2012 | Masuda et al. | 370/331 |
| 8,131,309 B2 * | 3/2012 | Miyazaki et al. | 455/465 |
| 8,149,264 B2 * | 4/2012 | Franceschini et al. | 348/14.12 |
| 8,199,691 B2 * | 6/2012 | Hisata et al. | 370/315 |
| 2002/0199016 A1 | 12/2002 | Freedman | |
| 2003/0086418 A1 | 5/2003 | McIntosh et al. | |
| 2004/0136324 A1 | 7/2004 | Steinberg et al. | |
| 2005/0014498 A1 | 1/2005 | Yamada et al. | |
| 2006/0111082 A1 | 5/2006 | Zhang | |
| 2006/0126595 A1 | 6/2006 | Dahm et al. | |
| 2007/0232353 A1 * | 10/2007 | Miyazaki et al. | 455/557 |
| 2008/0056138 A1 | 3/2008 | Saitoh | |
| 2008/0165683 A1 | 7/2008 | Saha et al. | |
| 2008/0320526 A1 * | 12/2008 | Franceschini et al. | 725/62 |

FOREIGN PATENT DOCUMENTS

| | | |
|---|---|---|
| JP | 2002-135265 | 5/2002 |
| JP | 2004-364054 | 12/2004 |
| JP | 2004-364278 | 12/2004 |
| JP | 2006-516371 | 6/2006 |
| JP | 2006-245779 | 9/2006 |
| JP | 2008-61047 | 3/2008 |
| JP | 2008-92154 | 4/2008 |
| JP | 2008-236043 | 10/2008 |
| JP | 2008-236543 | 10/2008 |
| WO | WO 98/19439 | 5/1998 |
| WO | 02/082722 A2 | 10/2002 |
| WO | 2008/125729 A1 | 10/2008 |

OTHER PUBLICATIONS

3rd Generation Partnership Project: "3GPP TS 23.401 V8.2.0 (Jun. 2008); 3rd Generation Partnership Project; Techincal Specification Group Services and Systems Aspects; General Packet Radio Service(GPRS) enhancements for Evolved Universal Terrestrial Radio Access(Release 8)", Jun. 9, 2008, pp. 1-182.

Huawei et al., "Tdoc S2-033453-W-APN resolution analysis", 3 GPP TSG-SA235, Bangkok, Thailand, vol. S2-033453, No. 35, Oct. 27, 2003, pp. 1-12.

European Search Report dated Mar. 17, 2010 and issued in corresponding European Patent Application 09172000.3.

Japanese Notice of Rejection Ground mailed Feb. 5, 2013, issued in corresponding Japanese Patent Application No. 2008-261857.

* cited by examiner

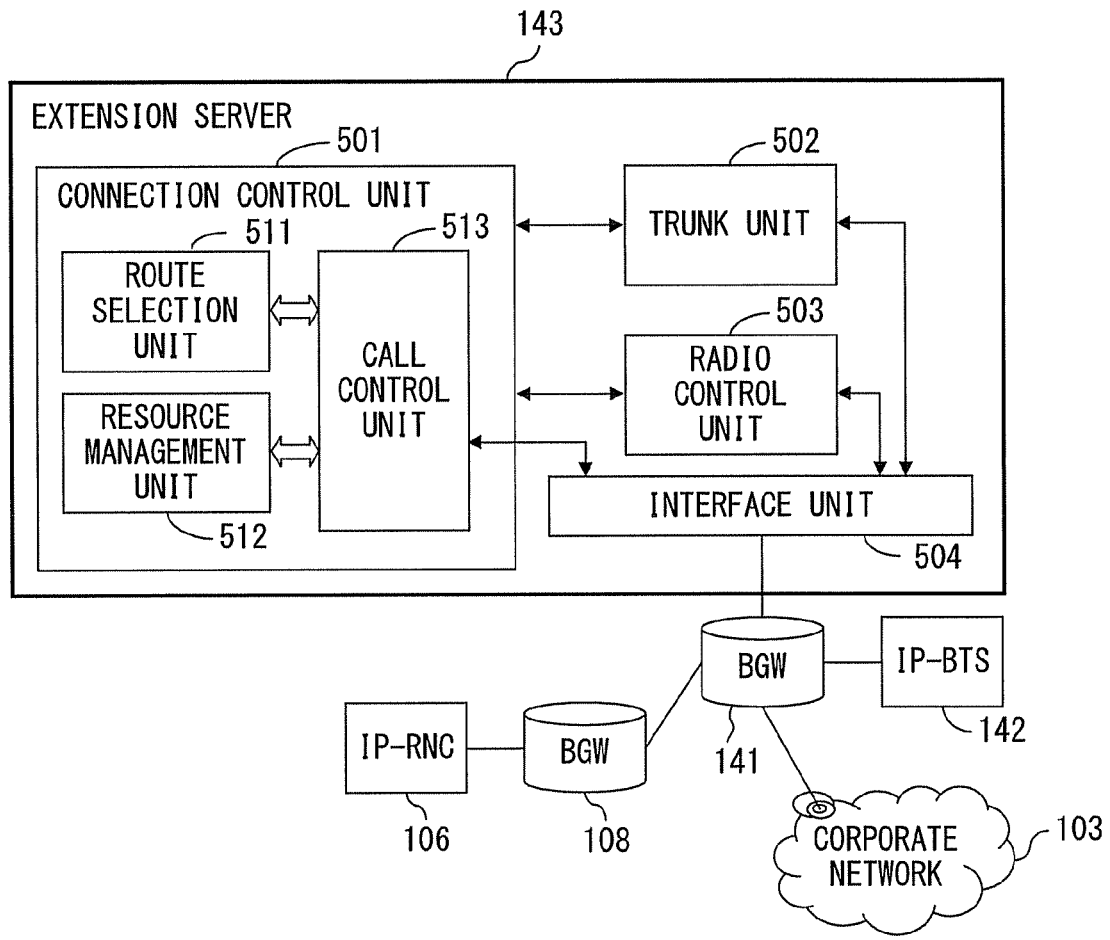
F I G. 5

| LOCATION | A | B | C | D |
|---|---|---|---|---|
| PUBLIC NETWORK | POSSIBLE | POSSIBLE | POSSIBLE | POSSIBLE |
| CORPORATE NETWORK | IMPOSSIBLE | POSSIBLE | POSSIBLE | IMPOSSIBLE |

FIG. 7

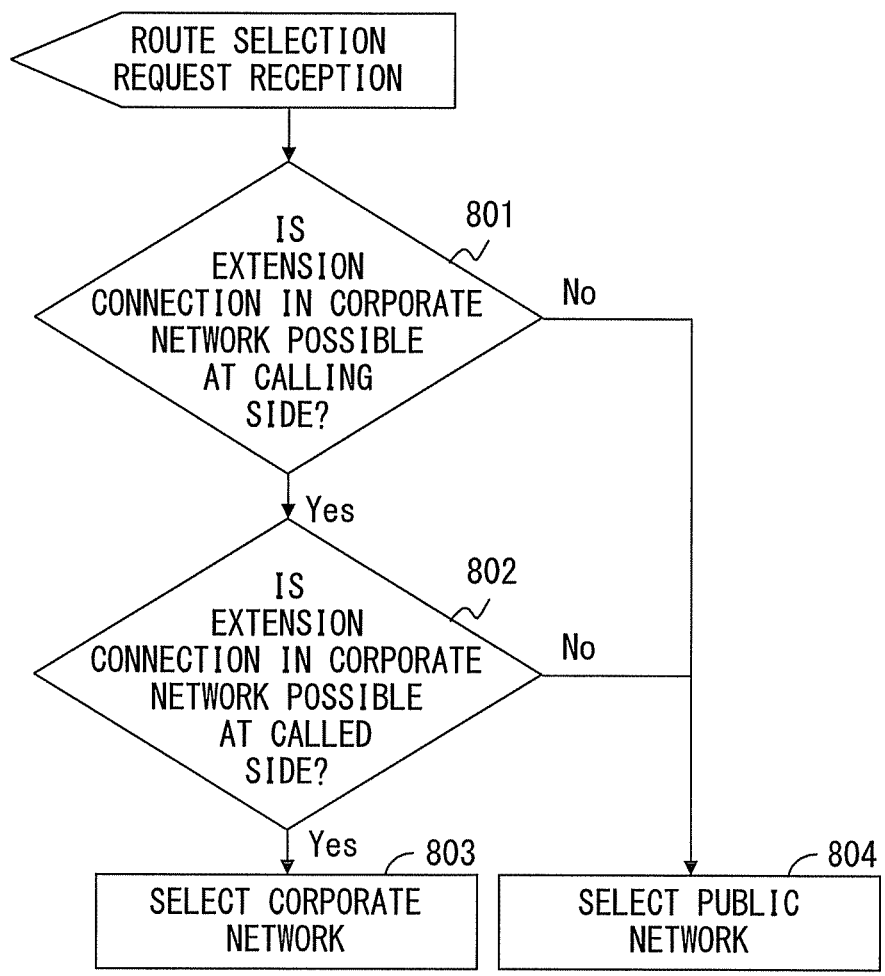
F I G. 8

| LOCATION / ROUTE | A | | B | | C | | D | |
|---|---|---|---|---|---|---|---|---|
| | POSSIBLE/IMPOSSIBLE | PRIORITY | POSSIBLE/IMPOSSIBLE | PRIORITY | POSSIBLE/IMPOSSIBLE | PRIORITY | POSSIBLE/IMPOSSIBLE | PRIORITY |
| PUBLIC NETWORK | POSSIBLE | 1 | POSSIBLE | 1 | POSSIBLE | 2 | POSSIBLE | 1 |
| CORPORATE NETWORK | IMPOSSIBLE | – | POSSIBLE | 2 | POSSIBLE | 1 | IMPOSSIBLE | – |

FIG. 9

| CLASS | VIP | ORDINARY |
|---|---|---|
| PUBLIC NETWORK | | WITH PRIORITY |
| CORPORATE NETWORK | WITH PRIORITY | |

FIG. 11

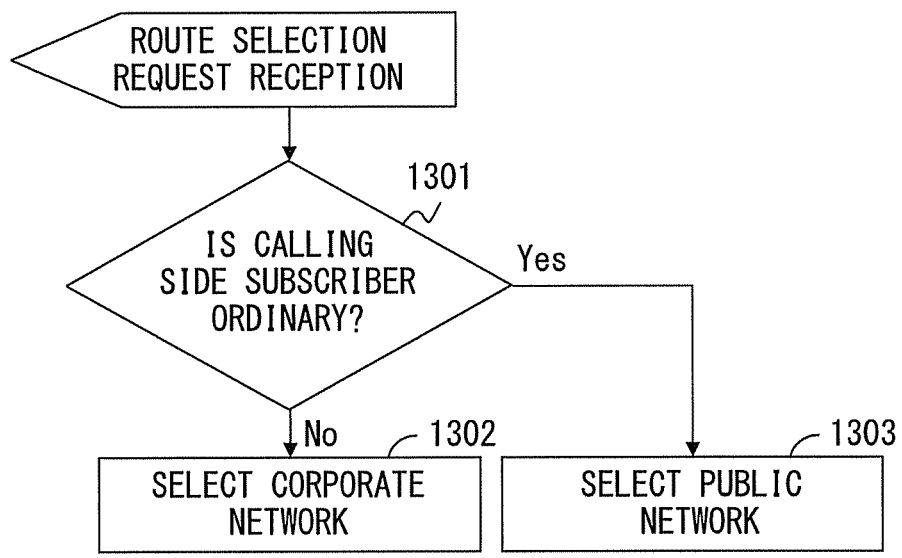
F I G. 1 3

| CALLING SIDE | CALLED SIDE | ROUTE |
|---|---|---|
| VIP | VIP | CORPORATE |
| VIP | ORDINARY | CORPORATE |
| ORDINARY | ORDINARY | PUBLIC |
| ORDINARY | VIP | PUBLIC |

FIG. 14

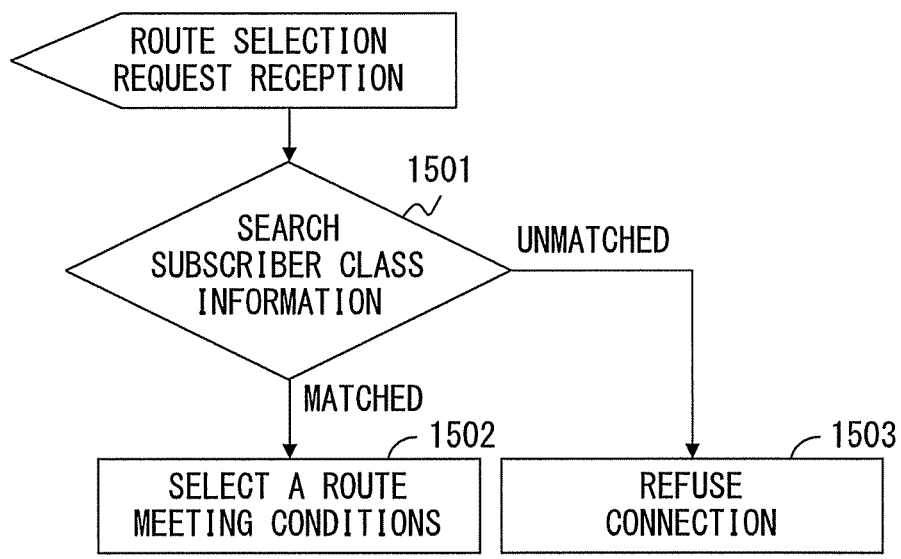
F I G. 15

| SERVICE TYPE | ROUTE |
|---|---|
| VOICE | CORPORATE |
| AV | PUBLIC |
| PACKET | CORPORATE |

F I G. 1 6

| ELEMENTS/CONDITIONS | EXTENSION SERVER | IP-RNC | CN SIDE |
|---|---|---|---|
| (1) LOCATION INFORMATION | × | ○ | ○ |
| (2) SUBSCRIBER CLASS INFORMATION | ○ | ○ | ○ |
| (3) USER SPECIFICATION | ○ | ○ | ○ |
| (4) ROUTE STATE MONITORING | ○ | ○ | ○ |
| (5) SERVICE TYPE INFORMATION | ○ | × | × |

FIG. 18

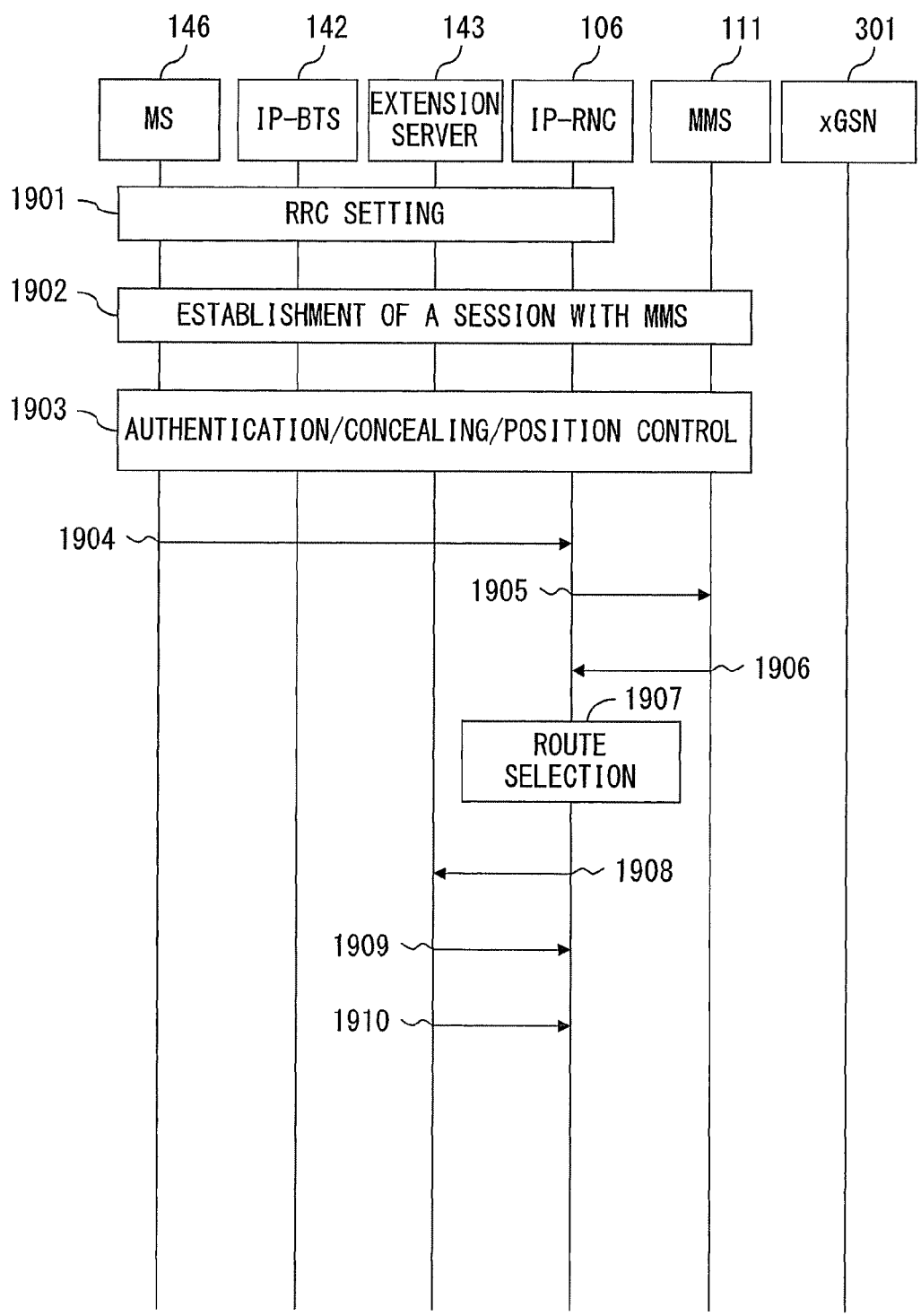
F I G. 1 9

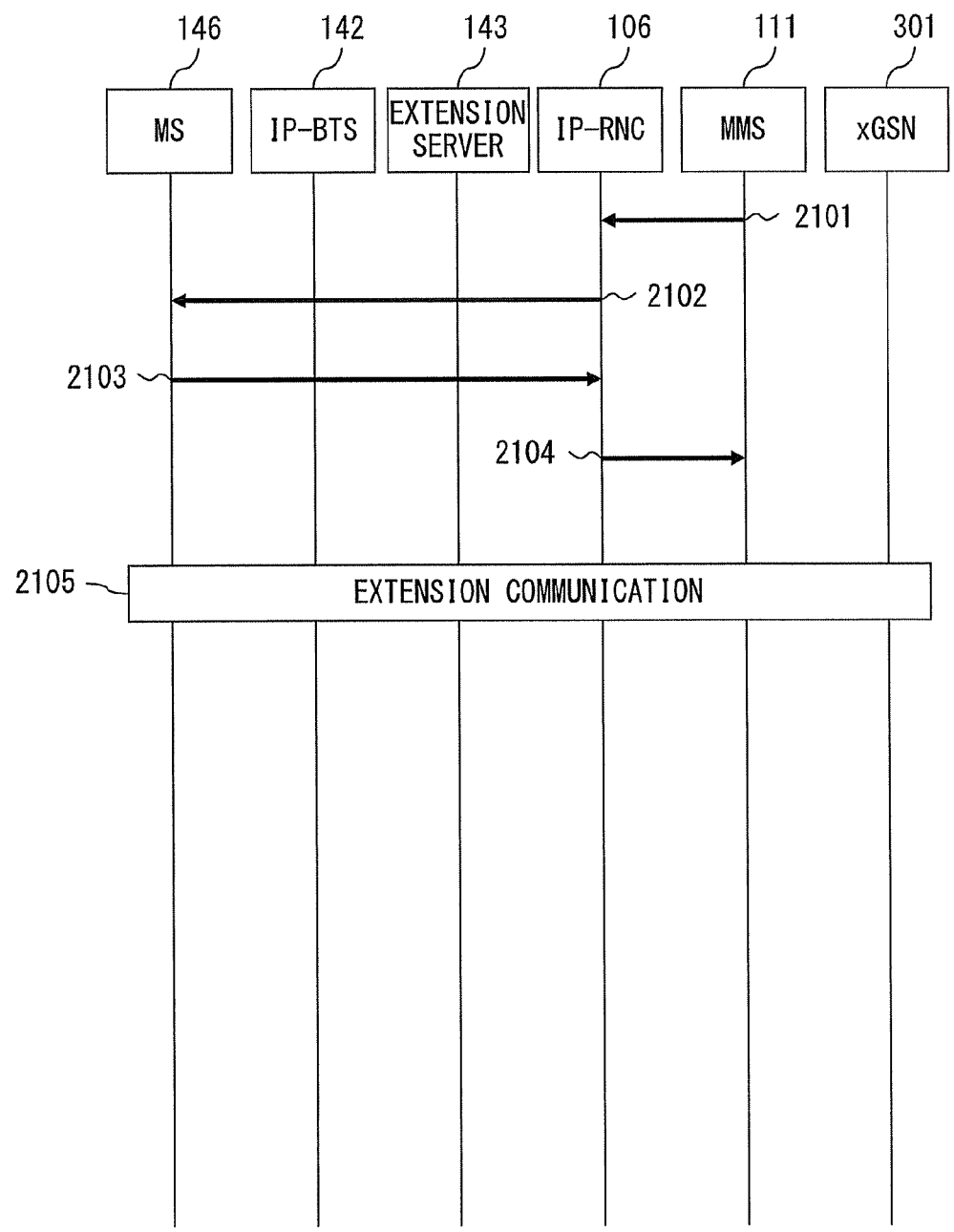
F I G. 2 1

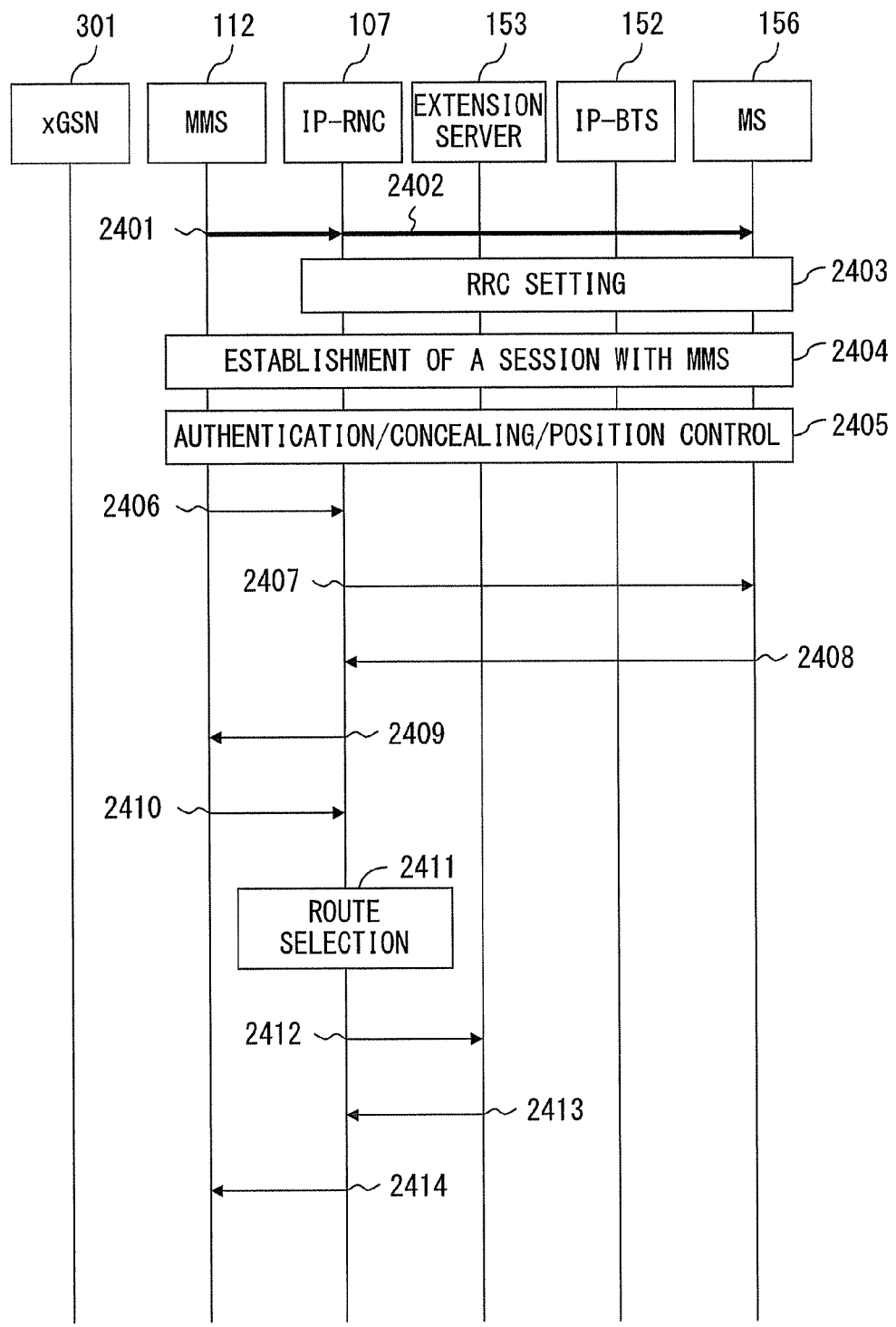
F I G. 2 4

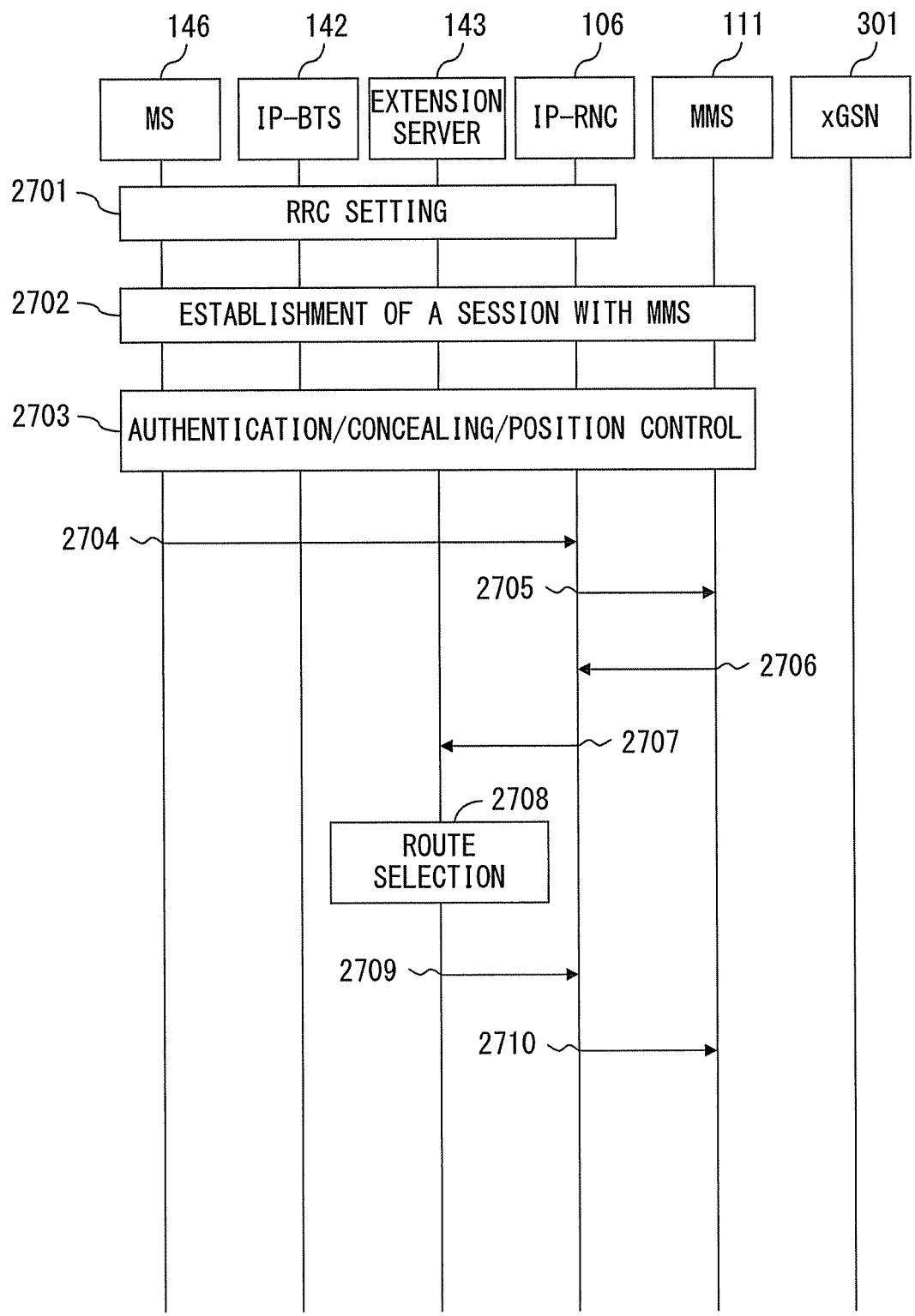
F I G. 2 7

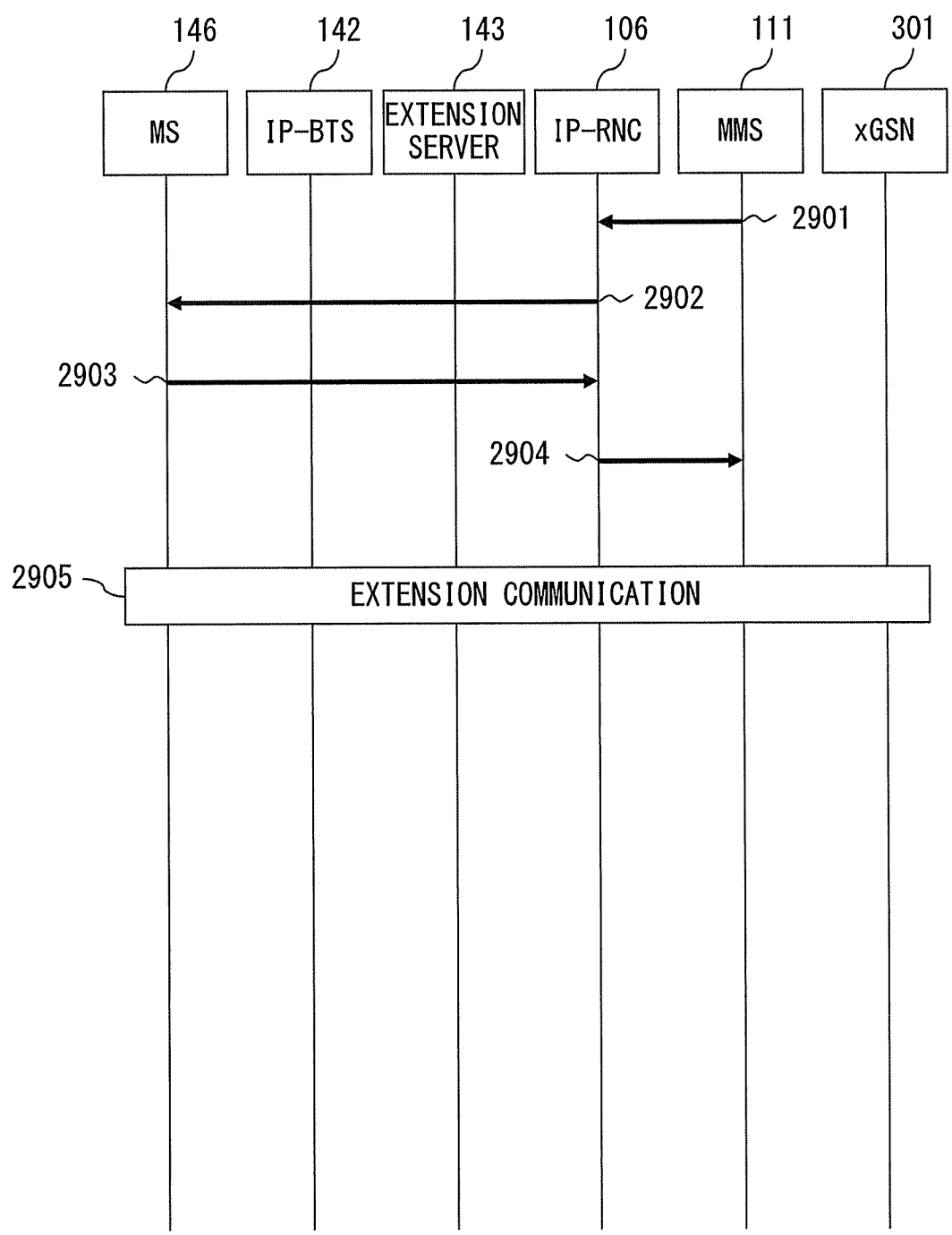
F I G. 29

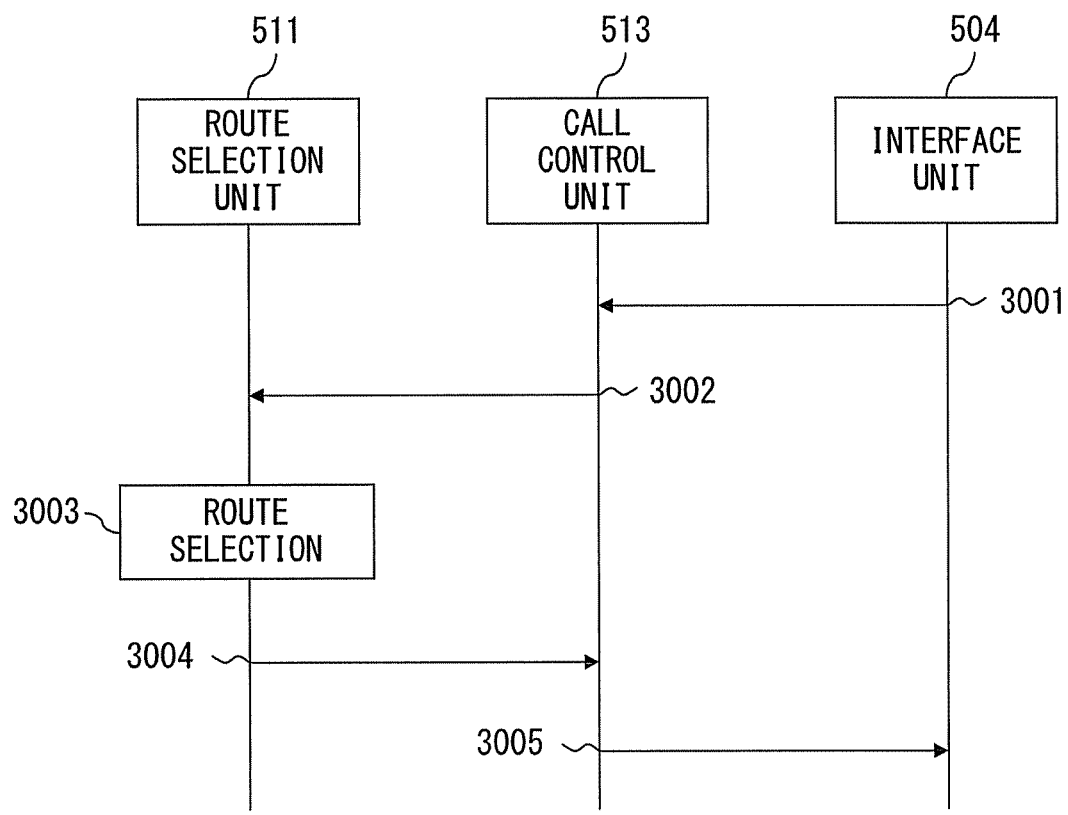
F I G. 30

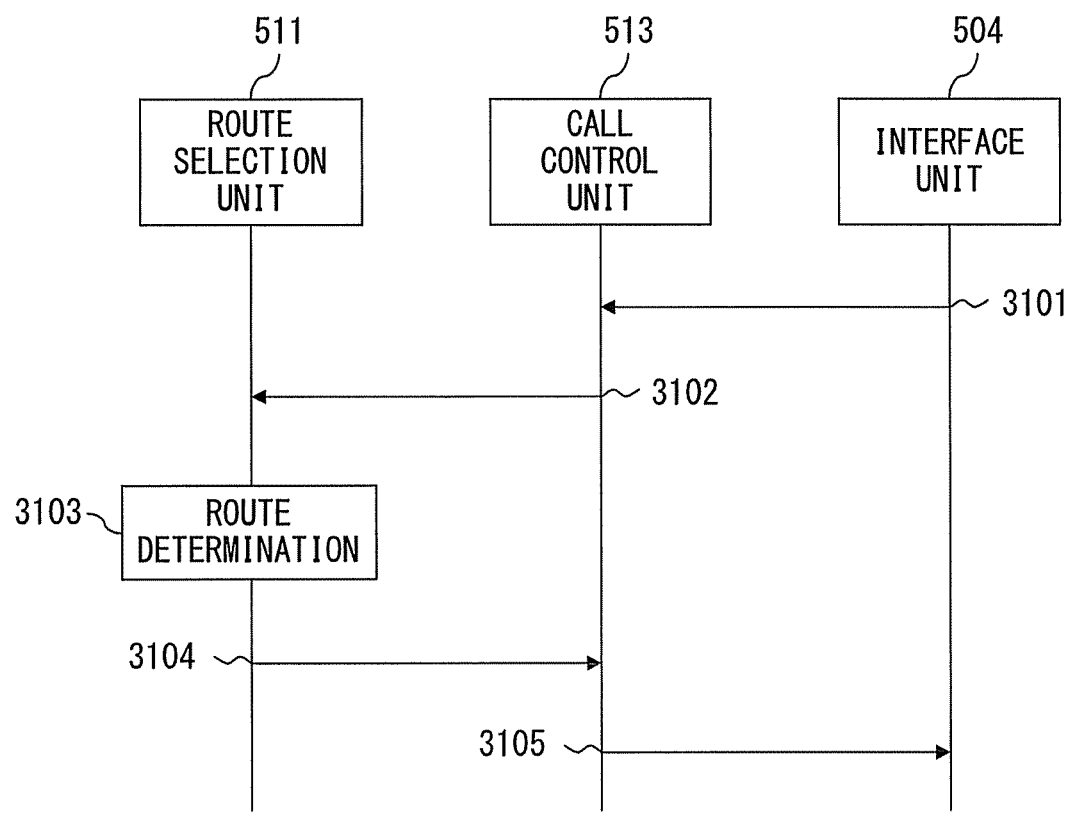
F I G. 3 1

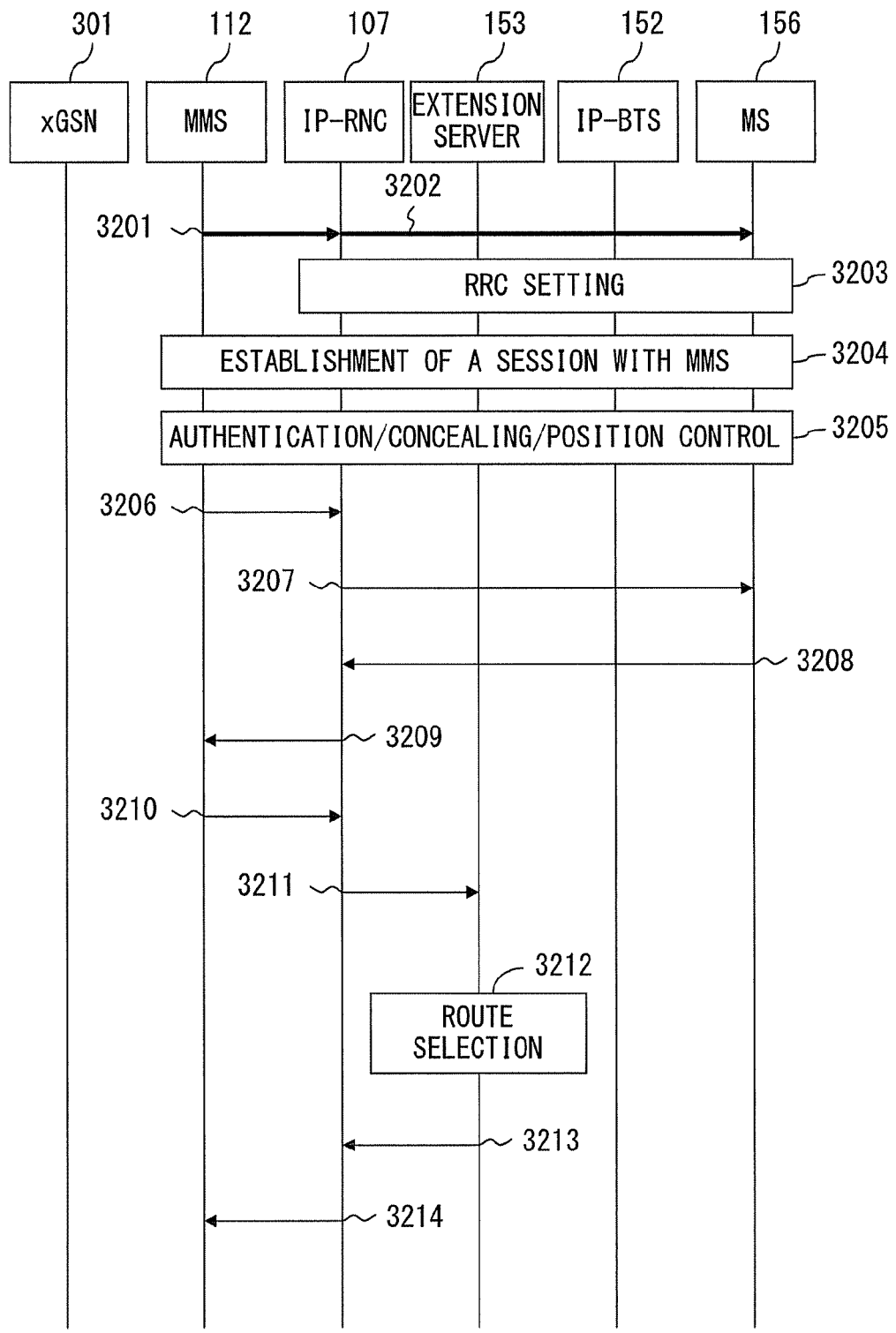
F I G. 3 2

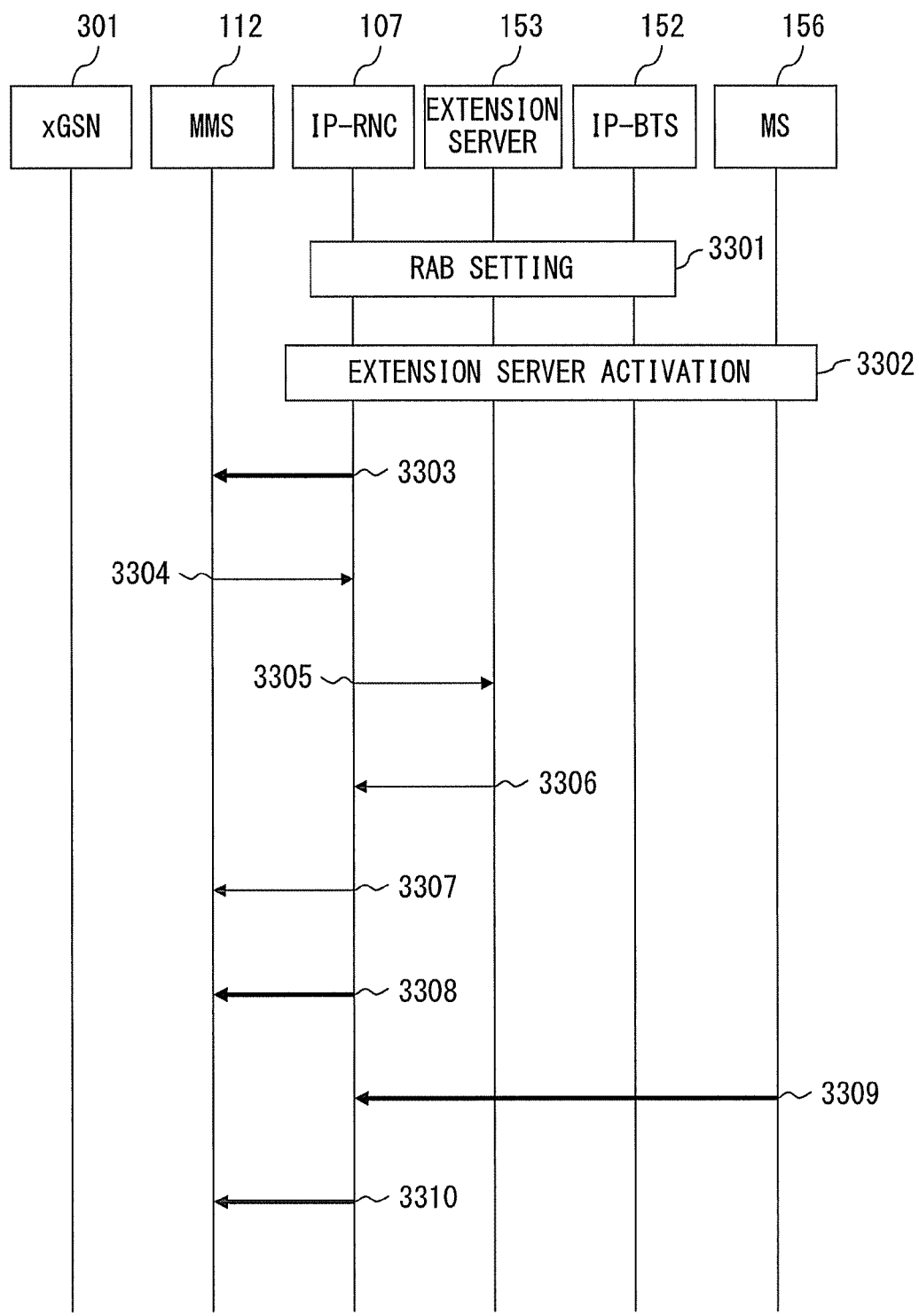
F I G. 3 3

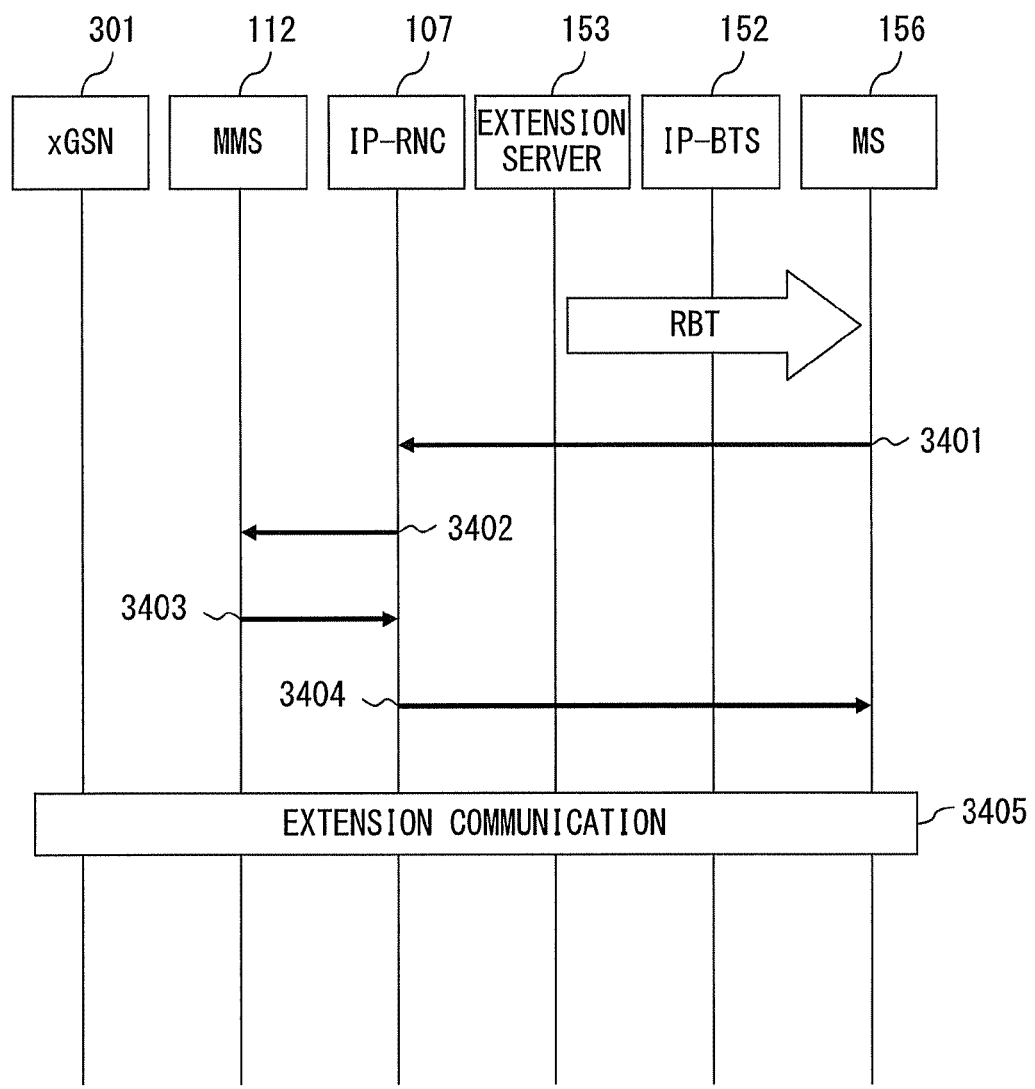
F I G. 34

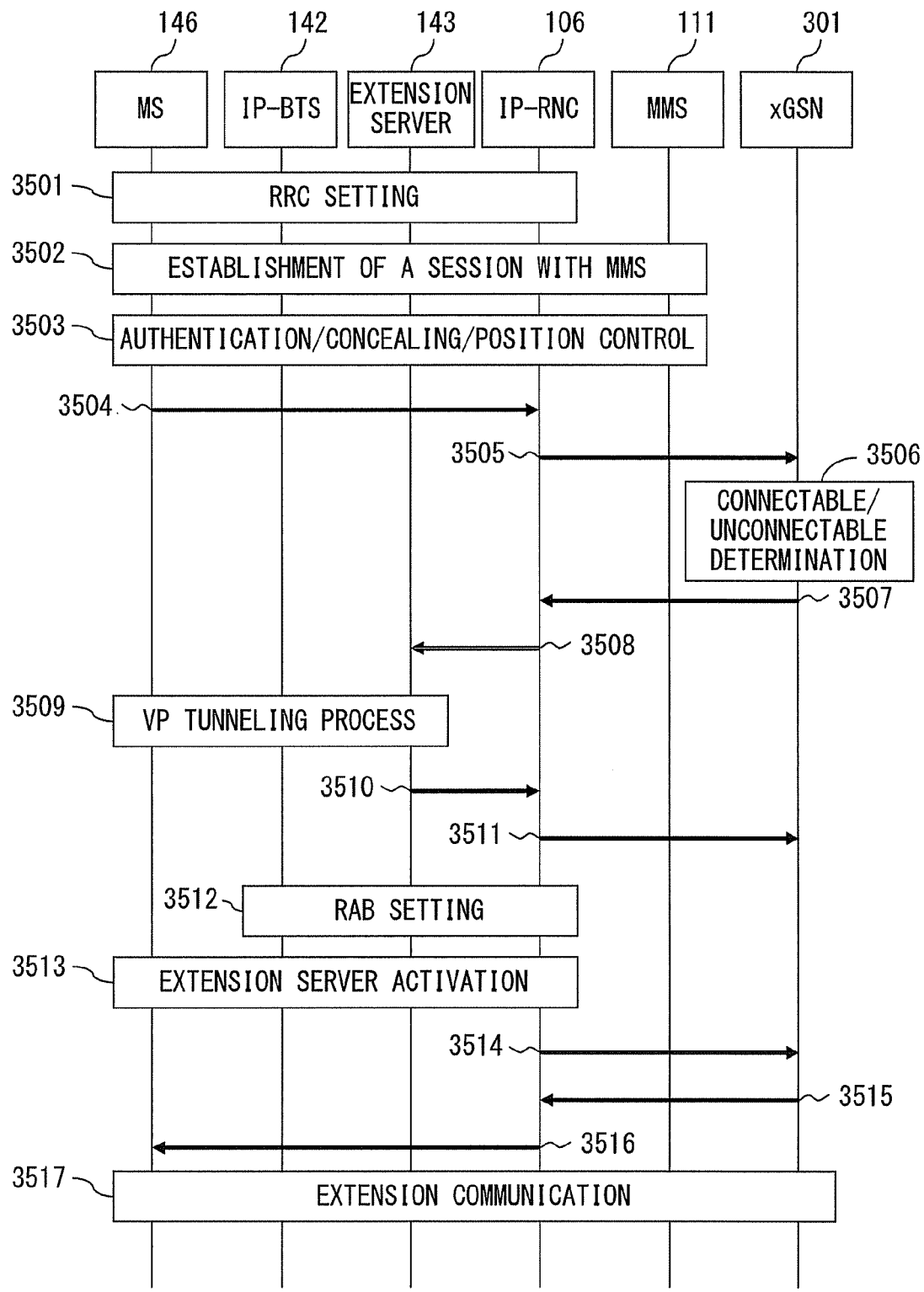
F I G. 35

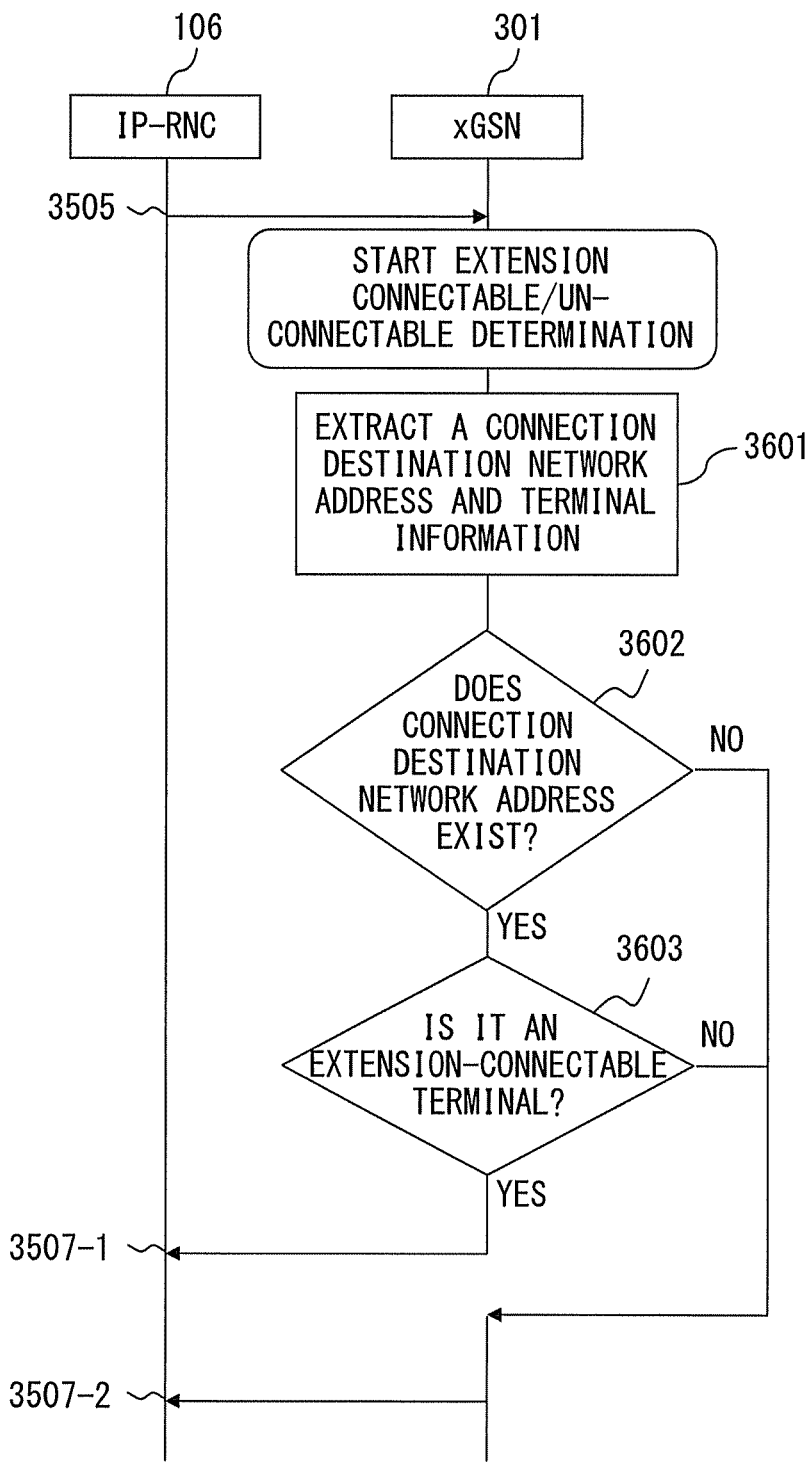
F I G. 3 6

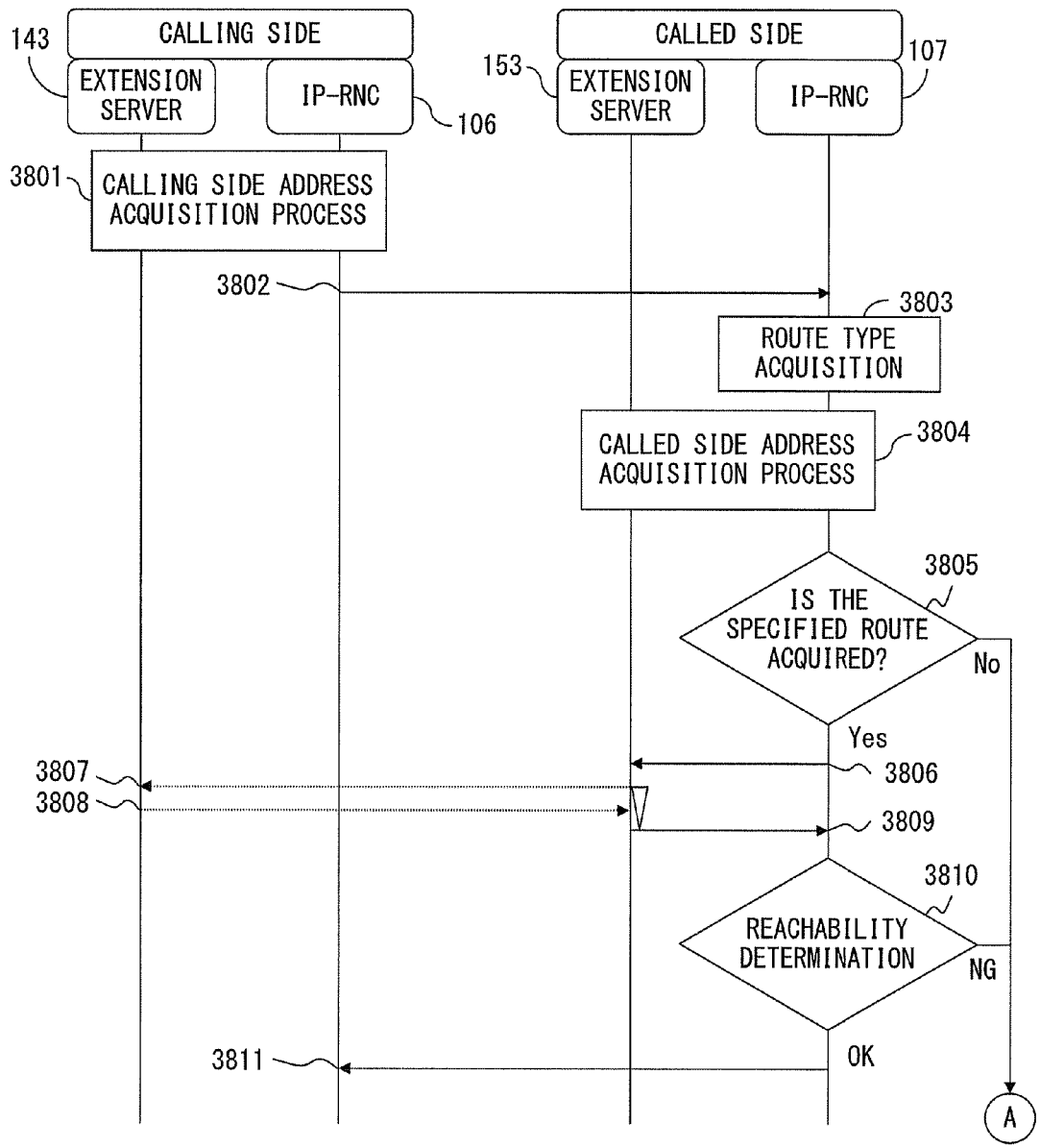
F I G. 3 8

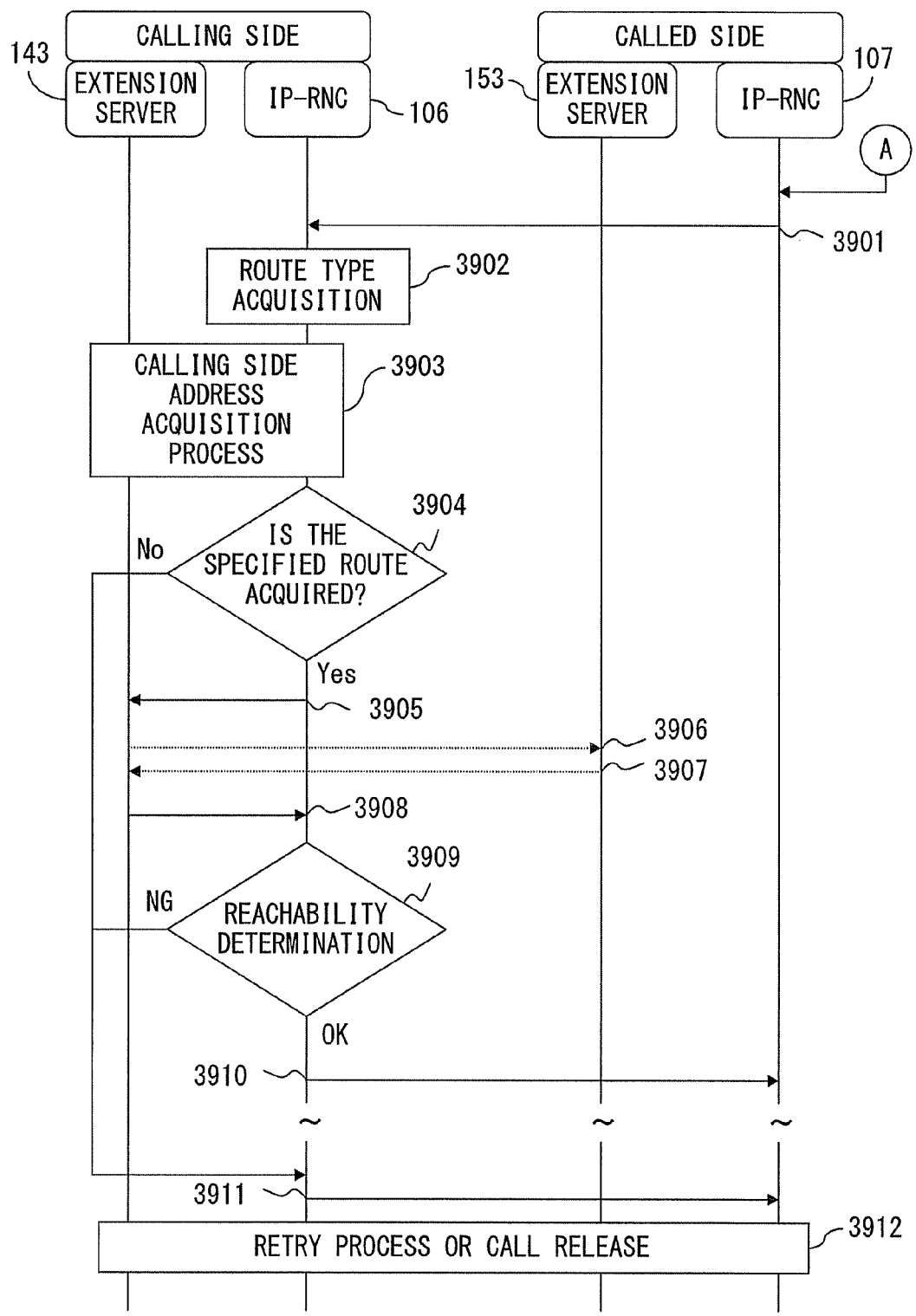
F I G. 39

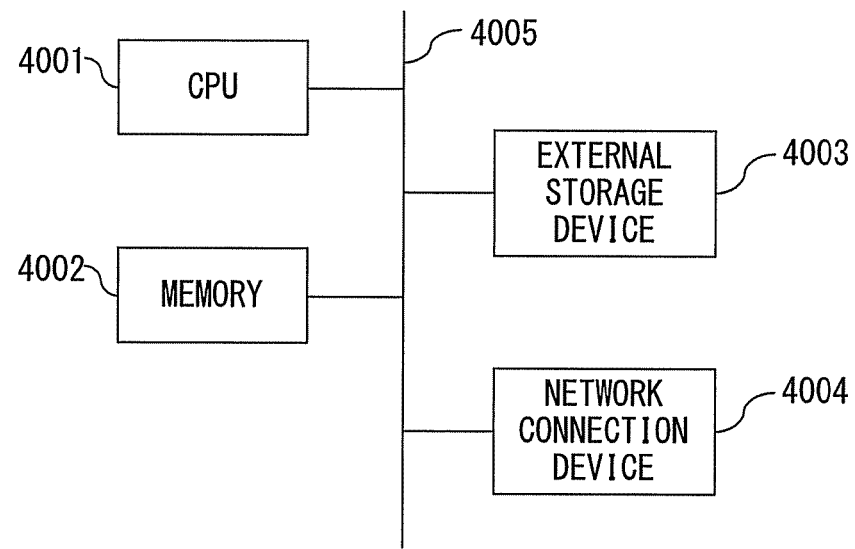
F I G. 4 0

EXTENSION CONNECTION METHOD AND ROUTE SELECTION DEVICE

CROSS-REFERENCE TO RELATED APPLICATIONS

This application is based upon and claims the benefit of priority of the prior Japanese Patent Application No. 2008-261857, filed on Oct. 8, 2008, the entire contents of which are incorporated herein by reference.

FIELD

The embodiments discussed herein are related to an extension connection method and a route selection device in a radio communication system.

BACKGROUND

In a radio communication system, an extension connection service using a mobile station (MS) is known. This radio communication system includes a plurality of mobile multimedia switching centers (MMSs) which are connected in such a way as to be communicated with each other.

A radio network controller (RNC) is connected to each MMS, to which a plurality of base transceiver stations (BTSs) and extension server devices (extension servers) are connected. The extension server has a function to loop back data and enables intra-office communications. Each MS communicates with a BTS by radio.

In such a radio communication system, communications are conducted between MSs by setting a communication line between RNCs through an MMS and an extension connection service is provided using an outdoor line (a public line, an internet protocol (IP) router network). Thus, for example, an extension connection can be possible between a location A in Kawasaki and a location B in Hiroshima.

A communication system for selecting an optimal communication path from among a plurality of communication paths including a public network and a dedicated line is also known (for example, see Patent documents 1 and 2).

Patent document 1: Japanese National Publication of International Patent Application No. 2001-503578
Patent document 2: Japanese Laid-open Patent Publication No. 2008-061047

SUMMARY

According to an aspect of the embodiment, an extension connection method establishes an extension connection between a first mobile terminal and a second mobile terminal in the following way.

Firstly, the first mobile terminal set transmits an extension connection request to a first extension connection route. Then, the first route selection device selects a first extension connection route from among a plurality of extension connection routes and transmits a type of the first extension connection route and calling-side address information used on the first extension connection route to the second route selection device. Then, the second route selection device selects a second extension connection route from among the plurality of extension connection routes and transmits the type of the second extension connection route and called-side address information used on the second extension connection route to the first route selection device. Then, if the second extension connection route coincides with the first extension connection route, the extension connection is established between the first mobile terminal and the second mobile terminal via the first extension connection route.

According to another aspect of the embodiment, a route selection device includes first and second receiving units, a selection unit, a transmitting unit, a determination unit and a connection unit.

The first receiving unit receives an extension connection request addressed to the second mobile terminal from the first mobile terminal. When receiving the extension connection request, the selection unit selects a first extension connection route from among a plurality of extension connection routes. The transmitting unit transmits a type of the first extension connection route and calling-side address information used on the first extension connection route to a called-side route selection device. The second receiving unit receives a type of a second extension connection route selected from among the plurality of extension connection routes and called-side address information used on the second extension connection route from the called-side route selection device. The determination unit determines whether the second extension connection route coincides with the first extension connection route. If the second extension connection route coincides with the first extension connection route, the connection unit establishes an extension connection between the first mobile terminal and the second mobile terminal via the first extension connection route.

According to further another aspect of the embodiment, an extension connection method establishes a packet switching extension connection between a mobile terminal and a target server device having packet information in the following way.

Firstly, a mobile terminal transmits connection destination network address information of a virtual private network server device for connecting to a network to which the target server device belongs, to an extension connection determination device. Then, the extension connection determination device checks whether an address indicated by the connection destination network address information exists in an extension connection address list. If the address exists in the extension connection address list, the extension connection determination device instructs an extension server device to establish a packet switching extension connection. Then, the extension server device establishes a route between the mobile terminal and the virtual private network server device. Then, a packet switching extension connection is established between the mobile terminal and the target server device via the virtual private network server device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates a configuration of an extension server;
FIG. 7 illustrates first location information;
FIG. 8 is a flowchart of a first route selection algorithm;
FIG. 9 illustrates second location information;

FIG. 11 illustrates first subscriber class information;

FIG. 13 is a flowchart of a fourth route selection algorithm;

FIG. 14 illustrates second subscriber class information;

FIG. 15 is a flowchart of a fifth route selection algorithm;

FIG. 16 illustrates third subscriber class information;

FIG. 18 illustrates the relationship between a place where a route selection unit is mounted and a mountable route selection algorithm;

FIG. 19 illustrates a connection sequence on an extension connection calling side in the case where an IP-RNC selects a route (No. 1);

FIG. 21 illustrates a connection sequence on an extension connection calling side in the case where an IP-RNC selects a route (No. 3);

FIG. 24 illustrates a connection sequence on an extension connection called side in the case where an IP-RNC selects a route (No. 1);

FIG. 27 illustrates a connection sequence on an extension connection calling side in the case where an extension server selects a route (No. 1);

FIG. 29 illustrates a connection sequence on an extension connection calling side in the case where an extension server selects a route (No. 3);

FIG. 30 illustrates a sequence of a route selection process by an extension server;

FIG. 31 illustrates a sequence of a route determination process by an extension server;

FIG. 32 illustrates a connection sequence on an extension connection called side in the case where an extension server selects a route (No. 1);

FIG. 33 illustrates a connection sequence on an extension connection called side in the case where an extension server selects a route (No. 2);

FIG. 34 illustrates a connection sequence on an extension connection called side in the case where an extension server selects a route (No. 3);

FIG. 35 illustrates a connection sequence of a PS extension connection;

FIG. 36 illustrates a sequence of connectable/non-connectable determination process;

FIG. 38 illustrates a sequence of connection-time monitoring (No. 1);

FIG. 39 illustrates a sequence of connection-time monitoring (No. 2); and

FIG. 40 illustrates a configuration of an information processing device.

DESCRIPTION OF EMBODIMENTS

As described above, in the conventional radio communication system, communications are conducted between MSs by setting a communication line between RNCs via an MMS and an extension connection service is provided using an outdoor line. However, the conventional extension connection service has the following problems.

When an extension connection is established between MSs, a public network is used even between locations belonging to the same extension connection group. Therefore, even when a dedicated line, such as a corporate network, exists between locations in the same extension connection group, they are connected by the public network without using the dedicated line.

Thus, in a system using only the public network, an optimal route for an extension connection service cannot be automatically selected by a service type or form. Therefore, the dedicated line cannot be effectively utilized and differentiation by an inexpensive service, such as a fixed fee service and the like, cannot be provided. Such a problem occurs not only in a radio communication system in which a communication line is set between RNCs via an MMS but also in other radio communication systems for providing an extension connection service.

Preferred embodiments of the present invention will be explained with reference to accompanying drawings.

The radio communication system in the preferred embodiment has a plurality of routes for an extension connection and automatically determines which route should be selected with priority from among those routes on the basis of conditions, such as a subscriber or a station to be connected and the like. Then, an extension connection is established in the selected route.

Figure 1:
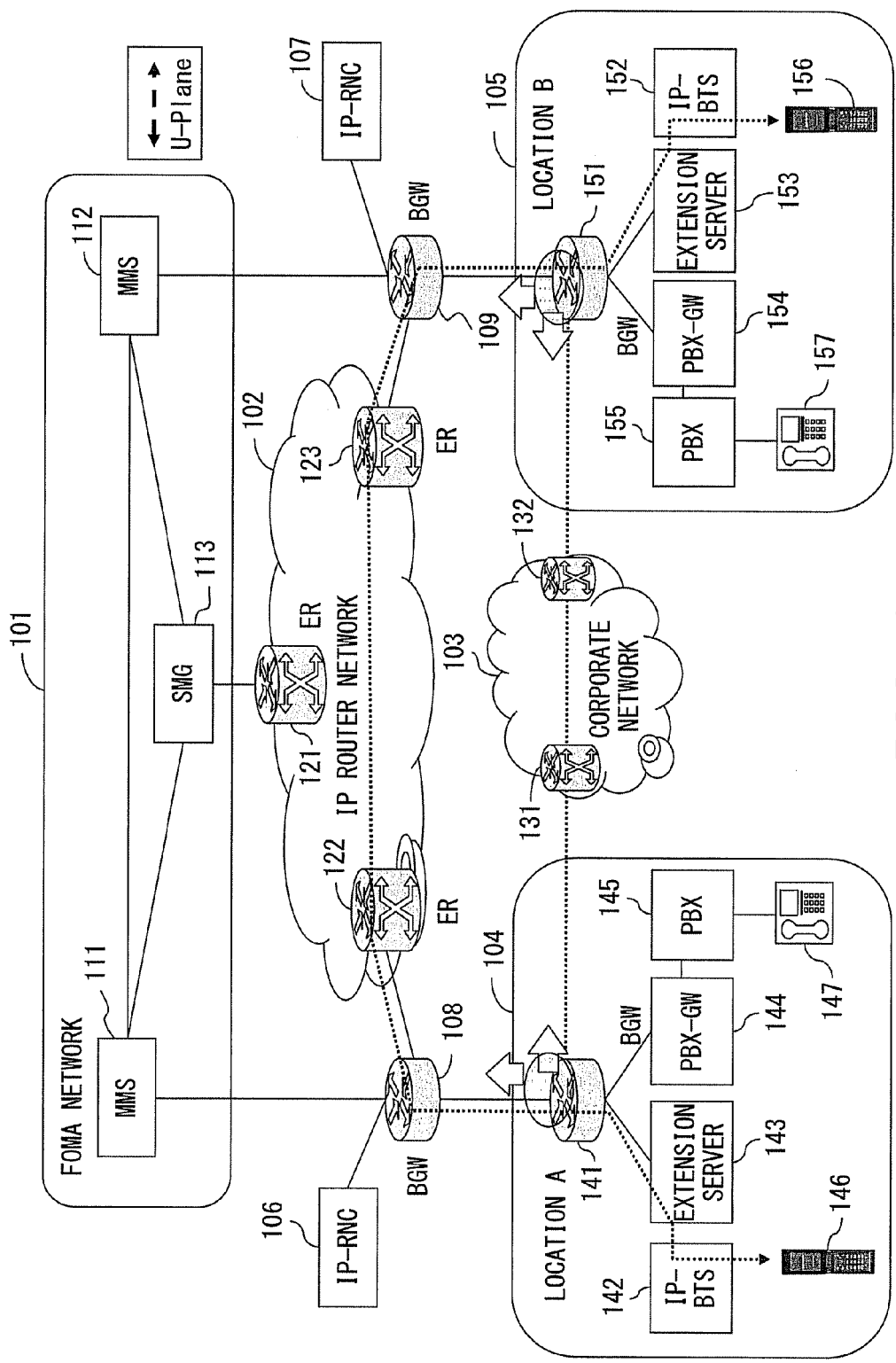
FIG. 1 illustrates a configuration of a first radio communication system.

FIG. 1 illustrates a configuration example of a circuit switching (CS) extension connection in such a radio communication system. This radio communication system includes a freedom of mobile multimedia access (FOMA (registered trade mark)) network 101, an IP router network (public network) 102, a corporate network 103, a location 104(A), a location 105(B), IP-RNCs 106 and 107 and boarder gateways (BGWs) 108 and 109.

The FOMA (registered trade mark) network 101 includes MMSs 111 and 112 and a signaling media gateway (SMG) 113. The MMSs 111 and 112 and a SMG 113 are connected to each other. The IP router network 102 includes edge routers (ERs) 121-123 and the corporate network 103 includes edge routers 131 and 132.

The location 104 includes a BGW 141, an IP-BTS 142, an extension server 143, a private branch exchange-gateway (PBX-GW) 144, a private branch exchange (PBX) 145, an MS 146 and a terminal device 147. The IP-BTS 142, the extension server 143 and the PBX-GW 144 are connected to the BGW 141 and the PBX 145 is connected to the PBX-GW 144. The terminal device 147 is, for example, telephone equipment and is connected to the PBX 145.

The location 105 includes a BGW 151, an IP-BTS 152, an extension server 153, a PBX-GW 154, a PBX 155, an MS 156 and a terminal device 157. The IP-BTS 152, the extension server 153 and the PBX-GW 154 are connected to the BGW 151 and the PBX 155 is connected to the PBX-GW 154. The terminal set 157 is, for example, telephone equipment and is connected to the PBX 155.

The edge router 121 of the IP router network 102 is connected to the SMG 113 and the edge routers 122 and 123 are connected to the BGWs 108 and 109, respectively. The MMS 112, the IP-RNC 106 and the BGW 141 are connected to the BGW 108 and the MMS 112, the IP-RNC 107 and the BGW 151 are connected to the BGW 109.

In such a radio communication system, when an extension connection is established between the MS 146 of the location 104 and the MS 156 of the location 105, two routes exist as the route of a U-plane (user data). A first route is a route from the BGW 141 to the BGW 151 via the BGW 108, the IP router network 102 and the BGW 109 and a second route is a route from the BGW 141 to the BGW 151 via the corporate network 103. In the second route, a dedicated line in the corporate network 103 is used.

Either each of IP-RNCs 106 and 107 or each of extension servers 143 and 153 selects any of the routes according to a specified algorithm.

Figure 2:
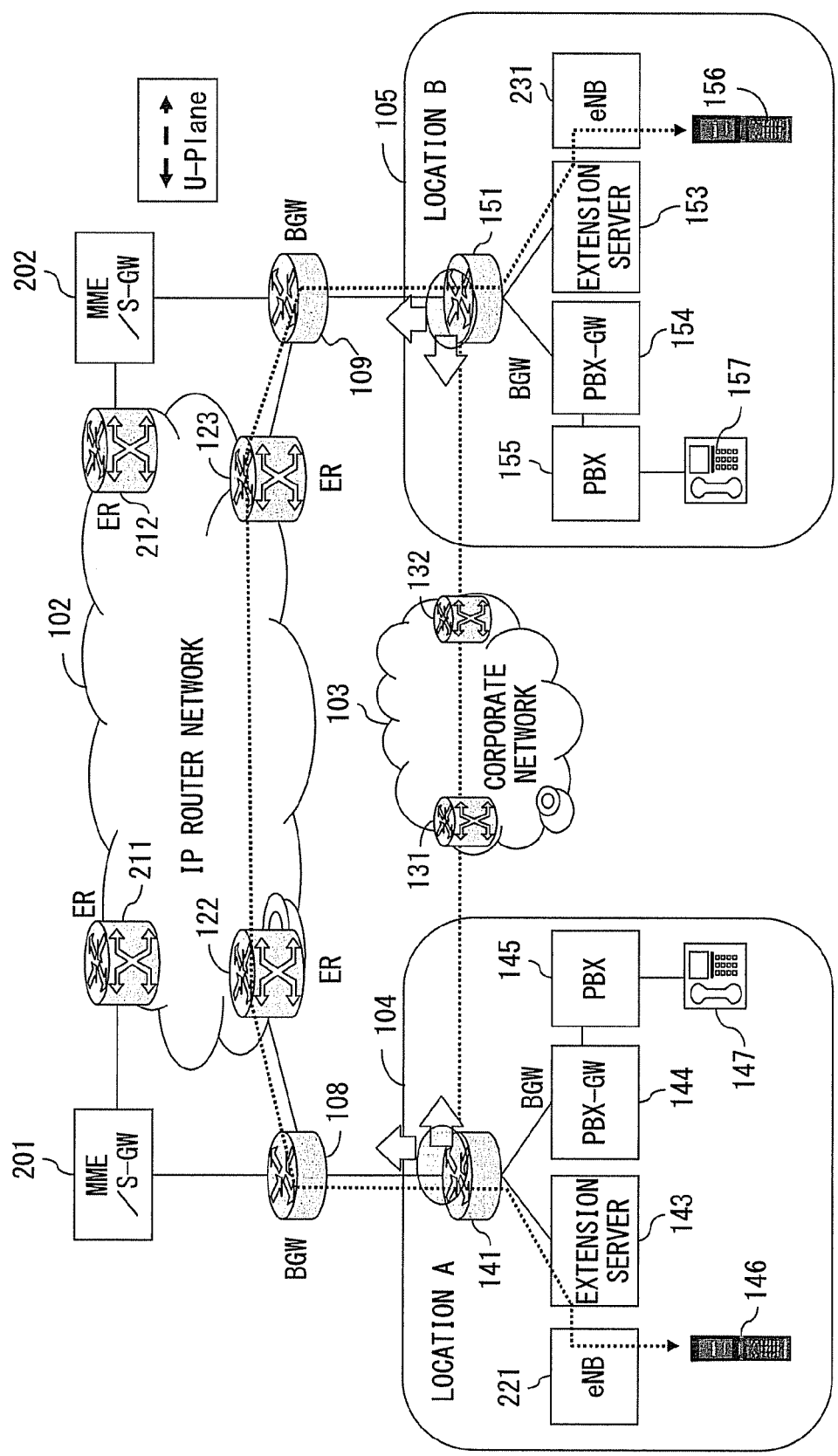
FIG. 2 illustrates a configuration of a second radio communication system.

FIG. 2 illustrates a configuration example in which the radio communication system illustrated in FIG. 1 is replaced with a long-term evolution (LTE) extension connection system. In this case, the radio communication system is composed using an evolved UTRAN node B (eNB) and a mobility management entity (MME) and a serving gateway (S-GW) corresponding to an evolved packet core (EPC).

The MME/S-GW 201 are connected to the edge router 211 of the IP router network 102 and the BGW 108, respectively and MME/S-GW 202 are connected to the edge router 212 of the IP router network 102 and the BGW 109, respectively. The IP-BISs 142 and 152 of the locations 104 and 105 are replaced with the eNBs 221 and 231, respectively.

In this configuration too, when an extension connection is established between the MS 146 of the location 104 and the MS 156 of the location 105, a route via the IP-router network 102 and a route via the corporate network 103 exist as the route of a U-plane (user data). Therefore, each of extension servers 143 and 153 selects any of the routes according to a specified algorithm.

According to such a radio communication system, not only the public network but also the corporate network can be selected as an extension connection route. Therefore, inexpensive services, such as a fixed fee service and the like, can be realized. Furthermore, since a plurality of routes exists for an extension connection, a detour/bypass route can be set up at the time of failure/traffic congestion and the like.

Figure 3:
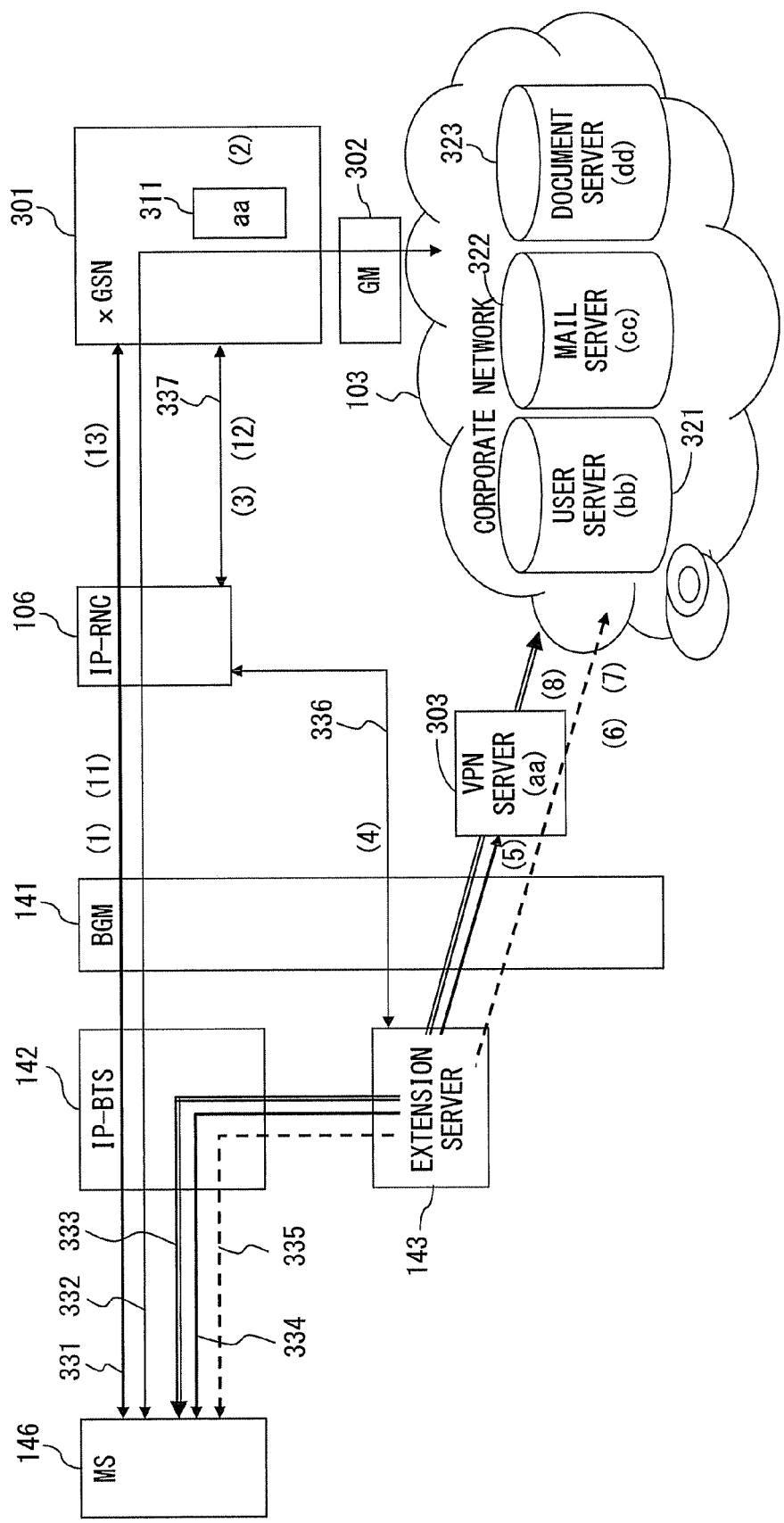
FIG. 3 illustrates the route of a PS extension connection.

In the radio communication systems illustrated in FIGS. 1 and 2, a packet communication may also be conducted besides a voice communication. For example, when packet switching (PS) extension connection is established in the radio communication system, the route becomes as illustrated in FIG. 3.

The MS 146 accesses the user server device (user server) 321, a mail server device (mail server) 322 and a document server device (document server) 323 of the corporate network 103 via the IP-RNC 106 or a virtual private network (VPN) server 303. The addresses of the VPN server device (VPN server) 303, the user server 321, the mail server 322 and the document server 323 are aa, bb, cc and dd, respectively.

A route 331 is the connection route of a C-plane (control signal) leading from the MS 146 to a service/gateway general packet radio support node (xGSN) 301 via the IP-BTS 142, the BGW 141 and the IP-RNC 106. The xGSN 301 is connected to the IP-RNC 106 via the MMS 111 and the BGW 108.

A route 332 is the connection route of a U-plane leading from the MS 146 to the corporate network 103 via the IP-BTS 142, the BGW 141, the IP-RNC 106, the xGSN 301 and the gateway (GW) 302.

A route 333 is the connection route (VP tunnel) of a U-plane leading from the MS 146 to the corporate network 103 via the IP-BTS 142, the extension server 143, the BGW 141 and the VPN server 303. A route 334 is the connection route of a C-plane leading from the MS 146 to the VPN server 303 via the IP-BTS 142, the extension server 143 and the BGW 141.

A route 335 is the connection route of a C-plane leading from the MS 146 to the user server 321 of the corporate network 103 via the IP-BTS 142, the extension server 143, the BGW 141 and the VPN server 303. A route 336 is the connection route of a C-plane between the extension server 143 and the IP-RNC 106. A route 337 is the connection route of a C-plane between the IP-RNC 106 and the xGSN 301.

Firstly, the connection procedures between the MS 146 and the VPN server 303 are as follows.

(1) The MS 146 notifies the xGSN 301 of the address aa of the VPN server 303 as a connection destination network address by an activate PDP context request on the route 331.

(2) The xGSN 301 detects the address aa from the extension connection address list 311.

(3) The xGSN 301 notifies the IP-RNC 106 of the fact that it is an extension connection, by an RAB assignment request on a route 337.

(4) The IP-RNC 106 notifies the extension server 143 of the line setting request on an extension connection for the address aa on the route 336.

(5) The extension server 143 establishes a route connection with the VPN server 303 on the route 334.

Next, the VPN connection procedures between the MS 146 and the corporate network 103 are as follows.

(6) The MS 146 and the VPN server 303 perform an access authentication process to the corporate network 103 on the route 335.

(7) A VP tunnel 333 is established between the MS 146 and the corporate network 103.

(8) The MS 146 is connected to various types of servers in the corporate network 103.

Then, the MS 146 can access the user server 321 and the like via the VP tunnel 333 and conduct a packet communication. Thus, the MS 146 can access packet information in the corporate network 103 by an extension connection.

However, the conventional PS-call connection procedures are as follows.

(11) The MS 146 transmits an activate PDP context request to the xGSN 301 on the route 331.

(12) The xGSN 301 transmits an activate PDP context accept to the MS 146 on the route 337.

(13) The xGSN 301 transmits an RAB assignment request to the IP-RNC 106 on the route 331.

After that, the MS 146 can access the user server 321 and the like via the route 332 and conduct a packet communication.

Figure 4:
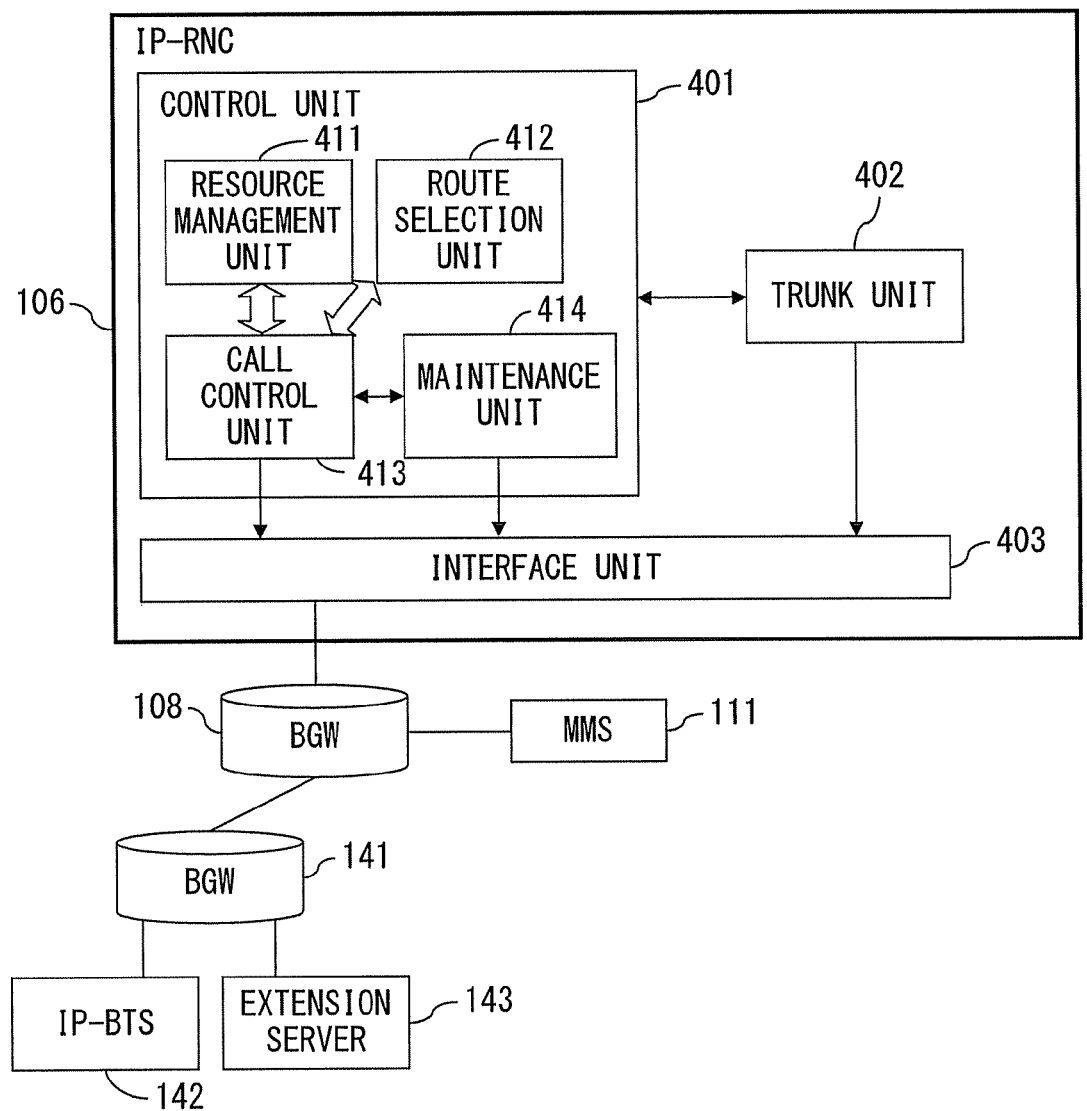
FIG. 4 illustrates a configuration of an IP-RNC.

FIG. 4 illustrates a configuration example of the IP-RNC 106 in the case where the IP-RNCs 106 and 107 select a route. The configuration of the IP-RNC 107 is the same as that of the IP-RNC 106.

The IP-RNC 106 includes a control unit 401, a trunk unit 402 and an interface unit 403. The control unit 401 includes a resource management unit 411, a route selection unit 412, a call control unit 413 and a maintenance unit 414.

The resource management unit 411 performs the idle/busy management, assignment of radio resources and system resources, such as an IP address, a user datagram protocol (UDP) port in the IP-RNC 106. The route selection unit 412 selects an extension connection route according to a specified algorithm. The call control unit 413 manages the sequence of call connection requests, such as a calling/called-side sequence and controls the resource management unit 411, the route selection unit 412 and the maintenance unit 414. The maintenance unit 414 performs device monitoring and control process, a file system operation process.

The trunk unit 402 performs the multiplexing/separation process of common-channel transmitting/receiving data, selection combining/reproduction and distribution process of dedicated channel transmitting/receiving data, the radio data link termination process of a packet communication. The interface unit 403 communicates with opposed devices, such as the MMS 111, the xGSN 301, the IP-RNC, the IP-BTS 142, the extension server 143, via the BGWs 108 and 109.

FIG. 5 illustrates a configuration example of the extension server 143 in the case where the extension servers 143 and 153 select routes. The configuration of the extension server 153 is the same as that of the extension server 143.

The extension server 143 includes a connection control unit 501, a trunk unit 502, a radio control unit 503 and an interface unit 504. The connection control unit 501 includes a route selection unit 511, a resource management unit 512 and a call control unit 513.

The route selection unit 511 stores route composition information and selects an extension connection route according to a specified algorithm. The resource management unit 512 performs the idle/busy management, assignment of radio resources and system resources, such as an IP address, an UDP port in the extension server 143. The call control unit 513 manages the sequence of call connection requests, such as a calling/called-side sequence and controls the route selection unit 511, the resource management unit 512.

The trunk unit 502 performs a wired synchronous control process, a sound source regeneration process, a user-data selection combining/reproduction and distribution process. The radio control unit 503 performs a radio-span concealing process, an outer-loop power control process. The interface unit 504 communicates with the IP-BTS 142, the IP-RNC 106, the corporate network 103 via the BGWs 109 and 108.

The route composition information of the route selection unit 511 is the information of respective locations between which an extension connection (inter-location connection) is established and indicates what routes exist after the BGW 141. The route composition information has, for example, composition illustrated in FIG. 6.

When extension servers [0] through [n] exist in respective locations in the radio communication system, the route composition information includes extension server information [0] through [n]. Each piece of the extension server information includes mounted/unmounted 601, an IP address type 602, an IP address 603, a UDP port number 604, mounted/unmounted 605, an IP address type 606, an IP address 607, a UDP port number 608 and a default gateway 609.

The mounted/unmounted 601 indicates whether an extension server supports an extension connection to the public network corresponding to the IP router network 102 and the IP address type 602 indicates the type of the public network IP address of the extension server. The IP address 603 and the UDP port number 604 indicate the public network IP address and UDP port number, respectively.

The mounted/unmounted 605 indicates whether an extension server supports an extension connection to the corporate network 103 and the IP address type 606 indicates the type of the corporate network IP address of the extension server. The IP address 607 and the UDP port number 608 indicate the corporate network IP address and UDP port number, respectively. The default gateway 609 indicates the identification information of a BGW to which the extension server is connected.

When an IP-RNC selects a route, it is passable for the IP-RNC to notify an extension server of a route type indicating the public network or the corporate network. Therefore, there is no need to store information of an IP address and the like in the IP-RNC. However, in this case too, the extension server stores the route composition information.

Alternatively, the extension server 143 may monitor the route state of the radio communication system and determine usability/non-usability of routes, the usage priority of a plurality of routes and the like. In this case, the route selection unit 511 monitors the state of an extension connection route by a monitoring method, such as full-time monitoring, connection-time monitoring or the like.

In the case of full-time monitoring, the route selection unit 511 obtains the state of each network by periodically transmitting reachability check information, such as an Internet control message protocol (ICMP) packet (packet Internet grouper (ping)) and the like, to each location based on the route composition information. The priority between the public and corporate networks can be determined according to the obtained states of the public and corporate networks.

However, in the case of connection-time monitoring, the route selection unit 511 obtains the state of each network by transmitting reachability check information, such as ping, to a connection destination after securing a connection route when an extension connection request is issued. Either the public network or the corporate network can be selected according to the obtained states of the public and corporate networks.

Next, a route selection algorithm by the route selection unit 412 or 511 will be explained with reference to FIGS. 7 through 18.

An algorithm based on location information selects a route according to where calling and called parties are located at the time of extension connection. The route selection unit, for example, stores location information illustrated in FIG. 7. In this example, whether extension connections to the public and corporate networks are possible at each of locations A through D is stored as location information. This location information may also be generated from the above-described route composition information. The route selection unit selects a route on which an extension connection is possible at both locations of calling and called parties, on the basis of this location information and select the corporate network if both the public and corporate networks are available.

Example 1

When a calling party at location A attempts to establish an extension connection with a called party at location B, the public network is selected since the corporate network is not available at location A.

Example 2

When a calling party at location B attempts to establish an extension connection with a called party at location C, the corporate network is selected since both the public and corporate networks are available at both the locations.

FIG. 8 is a flowchart of such a route selection algorithm. This process is started when a route selection request is received from a higher-order device. When the route selection unit exists in the IP-RNC, an RAB assignment request message transmitted from the MMS corresponds to the route selection request. When the route selection unit exists in the extension server, a line setting request transmitted from the IP-RNC corresponds to the route selection request.

When receiving the route selection request, the route selection unit firstly refers to location information and checks whether an extension connection in the corporate network is possible at the location of the calling party (step 801). If the extension connection in the corporate network is possible, it is checked whether an extension connection in the corporate network is possible at the location of the called party (step 802). If the extension connection in the corporate network is possible, the corporate network is selected (step 803). If in step 801 or 802 an extension connection in the corporate network is impossible, the public network is selected (step 804).

Alternatively, the public network may be selected with priority by adding route priority to location information. In this case, the route selection unit stores, for example, location information as illustrated in FIG. 9. In this example, the priority of the public network and that of the corporate network at location B are set to "1" and "2", respectively, and the priority of the public network and that of the corporate network at location C are set to "2" and "1", respectively. If both the public and corporate networks are available, the route selection unit selects one with higher priority on the basis of this location information.

Figure 10:
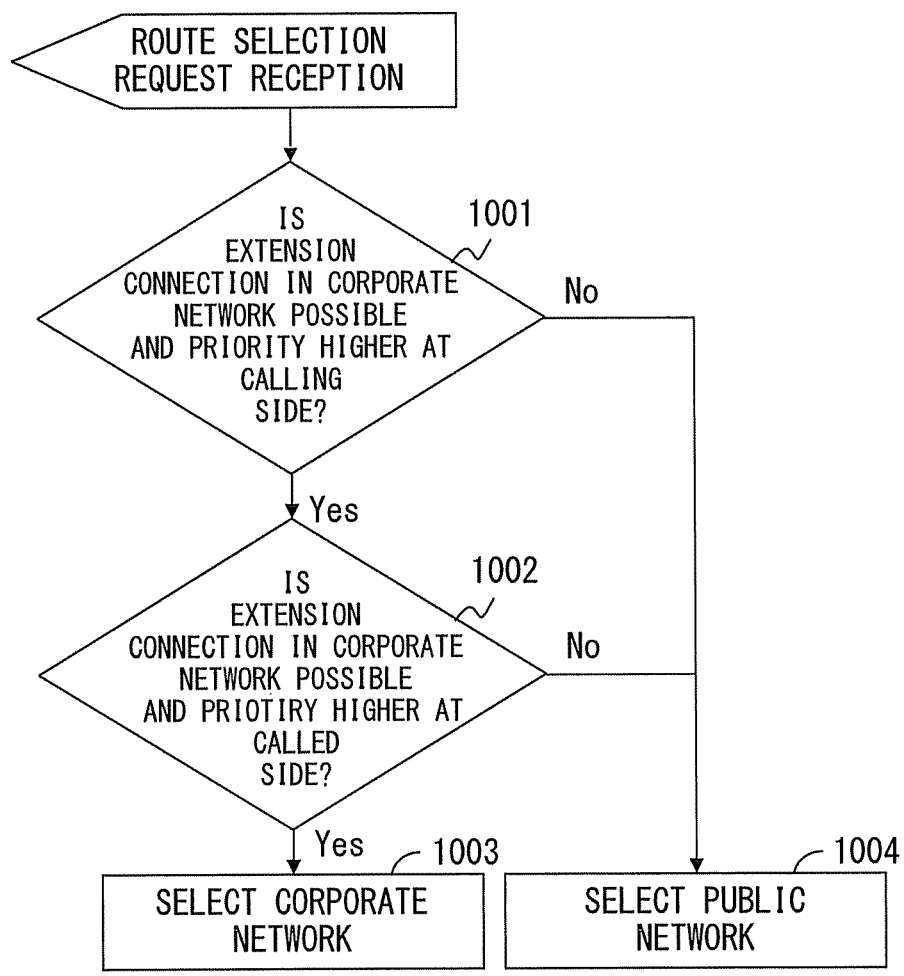
FIG. 10 is a flowchart of a second route selection algorithm.

FIG. 10 is a flowchart of such a route selection algorithm. When receiving a route selection request, the route selection unit firstly refers to location information and checks whether an extension connection in the corporate network is possible at the location of the calling party and its priority (step 1001). If the extension connection in the corporate network is possible and also the priority of the corporate network is higher than that of the public network, whether an extension connection in the corporate network is possible at the location of the called party and its priority are checked (step 1002). If the extension connection in the corporate network is possible and also the priority of the corporate network is higher than that of the public network, the corporate network is selected (step 1003).

If in step 1001 or 1002 an extension connection in the corporate network is impossible, the public network is selected (step 1004). Even if in step 1001 or 1002 an extension connection in the corporate network is possible, the public network is selected if the priority of the corporate network is lower than that of the public network (step 1004).

In the case of the above-described example 2, since the priority "1" of the corporate network at location C of the called party is lower than the priority "2" of the public network, the public network is selected.

In an algorithm based on subscriber class information, a route is selected according to the subscriber classes of both the calling and called parties at the time of extension connection. The route selection unit stores, for example, subscriber class information as illustrated in FIG. 11. In this example, such information that if a subscriber class is very important person (VIP), priority is given to the corporate network and if a subscriber class is ordinary, priority is given to the public network is stored as the subscriber class information. The subscriber classes of both the calling and called parties are identified by subscriber class transmitted from the MS. The route selection unit selects either the public network or the corporate network on the basis of subscriber class information.

Example 3

If the calling or called party is a VIP, the corporate network is selected.

Example 4

If the calling party is ordinary, the public network is selected regardless of the subscriber class of the called party.

Figure 12:
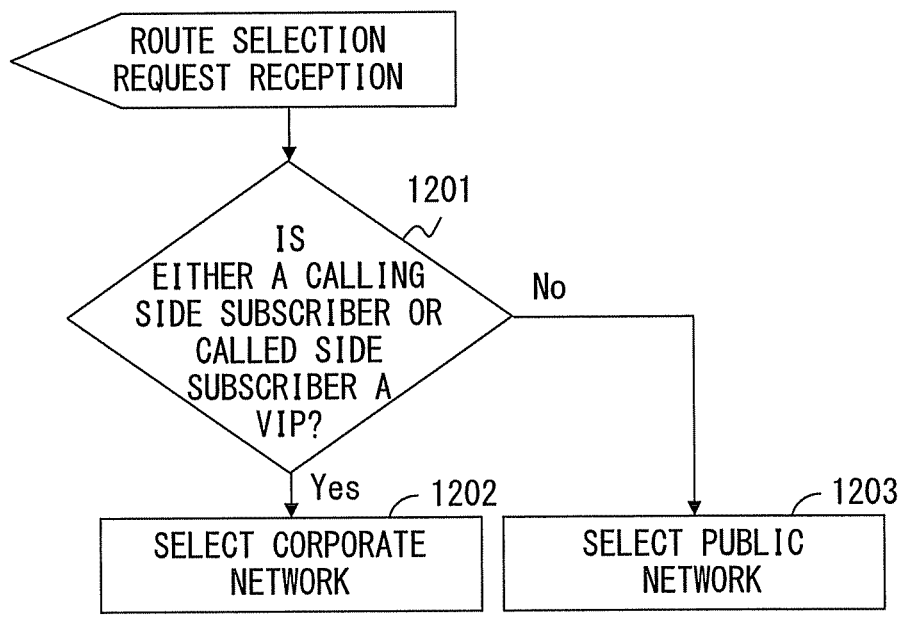
FIG. 12 is a flowchart of a third route selection algorithm.

FIG. 12 is a flowchart of the route selection algorithm in Example 3. When receiving a route selection request, the route selection unit firstly checks the subscriber classes of both the calling and called parties (step 1201). If either the calling party or the called party is a VIP, it selects the corporate network on the basis of the subscriber class information illustrated in FIG. 11 (step 1202). If the subscriber classes of both the calling and called parties are ordinary, it selects the public network on the basis of the subscriber class information illustrated in FIG. 11 (step 1203).

FIG. 13 is a flowchart of the route selection algorithm in Example 4. When receiving a route selection request, the route selection unit firstly checks the subscriber class of the calling party (step 1301). If the calling party is a VIP, it selects the corporate network on the basis of the subscriber class information illustrated in FIG. 11 (step 1302). If the calling party is ordinary, it selects the public network on the basis of the subscriber class information illustrated in FIG. 11 (step 1303).

Alternatively, the route selection algorithm in Example 4 may be realized by the subscriber class information illustrated in FIG. 14. This subscriber class information describes the relationship between the subscriber classes of the calling and called parties and a route to be selected.

FIG. 15 is a flowchart of this route selection algorithm. When receiving a route selection request, the route selection unit firstly checks the subscriber classes of both the calling and called parties and searches the subscriber class information illustrated in FIG. 14 (step 1501). Then, it selects a route corresponding to a combination of the subscriber classes of the calling and called parties (step 1502). If the subscriber class of either the calling or called party does not coincide with subscriber class information, it performs an error process and refuses a connection (step 1503).

In an algorithm based on a user specification, a route (either the corporate or public network) specified by a calling party at the time of extension connection is selected.

In an algorithm based on a service type, either the corporate or public network is selected according to a service type, such as a voice communication, a packet communication, video (AV) and the like. The route selection unit stores, for example, service type information as illustrated in FIG. 16. In this example, such information indicating that if the service type is either a voice or packet communication, the corporate network is selected and if it is AV, the public network is selected is stored as the service type information.

Figure 17:
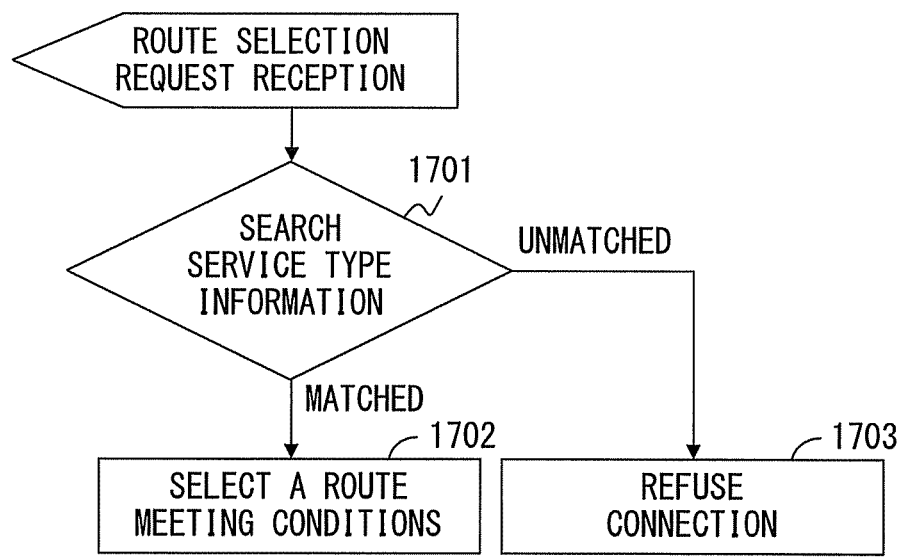
FIG. 17 is a flowchart of a sixth route selection algorithm.

FIG. 17 is a flowchart of this route selection algorithm. When receiving a route selection request, the route selection unit firstly checks the service type and searches the service type information illustrated in FIG. 16 (step 1701). Then, it selects a route corresponding to the service type (step 1702). When the service type does not coincide with one registered in the service type information, it performs an error process and refuses a connection (step 1703).

In an algorithm based on route state monitoring, the route selection unit avoids an unusable route and selects a usable route.

Furthermore, a route may also be selected by combining the elements and conditions of the above-described various types of algorithms or specifying the priority of such elements and conditions.

The route selection unit may be mounted not only on the extension server or the IP-RNC but also on the MMS or xGSN of the core network (CN) side. FIG. 18 illustrates the relationship between a place where the route selection unit is mounted and a mountable route selection algorithm. The algorithm based on location information may be mounted on the IP-RNC and the CN and the algorithm based on route state monitoring may be mounted on the extension server. The algorithm based on subscriber class information, a user specification or service type may be mounted on any place.

Next, an example of the connection sequence in the case where an extension call is placed from the MS 146 at the location 104 to the MS 156 at the location 105 will be explained with reference to FIGS. 19 through 26. In this example, it is assumed that the IP-RNCs 106 and 107 select a route.

Figure 20:
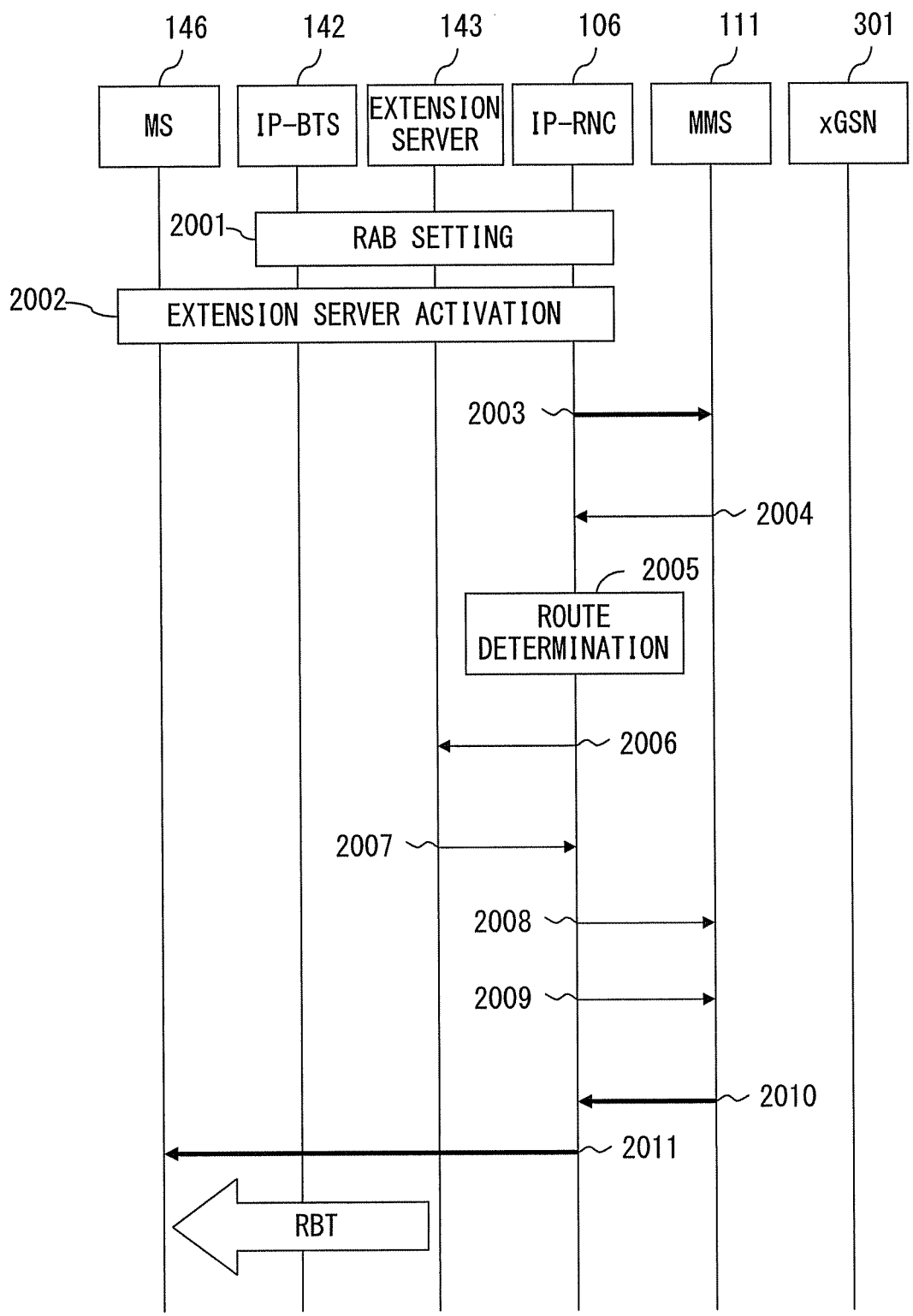
FIG. 20 illustrates a connection sequence on an extension connection calling side in the case where an IP-RNC selects a route (No. 2)

FIGS. 19 through 21 illustrate a connection sequence on the calling side. Firstly, a radio resource control (RRC) is set between the MS 146 and the IP-RNC 106 (step 1901). Then, a session is established between the MS 146 and the MMS 111 (step 1902) and authentication, concealing and position control processes are performed (1903).

Then, the MS 146 transmits the following uplink direct transfer message of the RRC to the IP-RNC 106 and requests for an extension connection (step 1904).

RRC:UPLINK DIRECT TRANSFER(CC:SETUP) (DCH:DCCH, AM)(CalledPartyBCDNumber:(184/186+) (extension service prefix*55+) calling number)

Then, the IP-RNC 106 transmits the following direct transfer message of a radio access network application part (RANAP) to the MMS 111 (step 1905).

RANAP:DIRECT TRANSFER(CC:SETUP)

Then, the MMS 111 transmits the RAB assignment request message of the RANAP to the IP-RNC 106 (step 1906). This message includes complete location IDs on both the calling and called sides.

Upon receipt of the RAB assignment request message, the IP-RNC 106 selects either the public or corporate network as a connection route (step 1907) and notifies the extension server 143 of the type of either the public or corporate network by a line setting request (step 1908).

The extension server 143 transmits a line setting response to the IP-RNC 106 (step 1909) and the IP-RNC 106 transmits a network-side connection information report to the MMS 111 (step 1910). The line setting response and the network-side connection information report include the type of the route reported from the IP-RNC 106 and both the IP address and UDP port number of the calling-side extension server 143, corresponding to the type. The network-side connection information report is transferred from the MMS 111 to the MMS 112.

Then, a radio access bearer (RAB) is set between the IP-BTS 142 and the IP-RNC 106 (step 2001) and an extension server activation process is performed between the MS 146 and the IP-RNC 106 (step 2002). Then, the IP-RNC 106 transmits the RAB assignment response message of the RANAP to the MMS 111.

When receiving a network-side connection information report on the called side, transmitted in step 2414, which will be described later, the MMS 111 transmits an extension server connection destination change request to the IP-RNC 106 (step 2004). The extension server connection destination change request includes the type of the route selected on the called side and both the IP address and UDP port number of the called-side extension server 153, corresponding to the type together with the complete location IDs on both the calling and called sides.

The IP-RNC 106 determines whether the route selected on the called side coincides with the route selected on the calling side (step 2005). If those routes are different, a route is re-selected by performing the same process as in step 1907 and if the same route as selected on the called side cannot be selected, a disconnection process is performed.

Then, the IP-RNC 106 notifies the extension server 143 of the type of either a route re-selected on the calling side or the route selected on the called side (step 2006). When the route selected on the called side is reported, its connection destination change request also includes both the IP address and UDP port number of the called-side extension server 153.

The extension server 143 transmits a connection destination change response to the IP-RNC 106 (step 2007). Then, the IP-RNC 106 transmits a network-side connection information report to the MMS 111 (step 2008) and then transmits an extension server connection destination change response to the MMS 111 (step 2009).

However, the network-side connection information report is transmitted only when a route is re-selected in step 2005. In this case, the network-side connection information report includes the type of the route re-selected on the calling side and both the IP address and UDP port number of the calling-side extension server 143, corresponding to the type. The network-side connection information report is transferred from the MMS 111 to the MMS 112.

The extension server connection destination change response indicates whether a route can be changed to the route specified in the extension server connection destination change request.

Then, the MMS 111 transmits the following direct transfer message of RANAP to the IP-RNC 106 (step 2010).

RANAP:DIRECT TRANSFER(CC:ALERTING)

Then, the IP-RNC 106 transmits the following downlink direct transfer message of RRC to the MS 146 (step 2011).

RRC:DOWNLINK DIRECT TRANSFER(CC:ALERTING(DCH:DCCH, AM))

Thus, a ringing back tone (RET) is transmitted from the extension server 153 to the MS 146. Then, the MMS 111 transmits the following direct transfer message of RANAP to the IP-RNC 106 (step 2101).

RANAP:DIRECT TRANSFER(CC:CONNECT)

Then, the IP-RNC 106 transmits the following downlink direct transfer message of RRC to the MS 146 (step 2102).

RRC:DOWNLINK DIRECT TRANSFER(CC:CONNECT(DCH:DCCH, AM))

Then, the MS 146 transmits the following uplink direct transfer message of RRC to the IP-RNC 106 (step 2103).

RRC:UPLINK DIRECT TRANSFER(CC:CONNECT ACKNOWLEDGE(DCH:DCCH, AM))

Then, the IP-RNC 106 transmits the following direct transfer message of RANAP to the MMS 111 (step 2104).

RANAP:DIRECT TRANSFER(CC:CONNECT ACKNOWLEDGE)

Then, the MS 146 performs an extension communication with the called-side MS 156 (step 2105).

Figure 22:
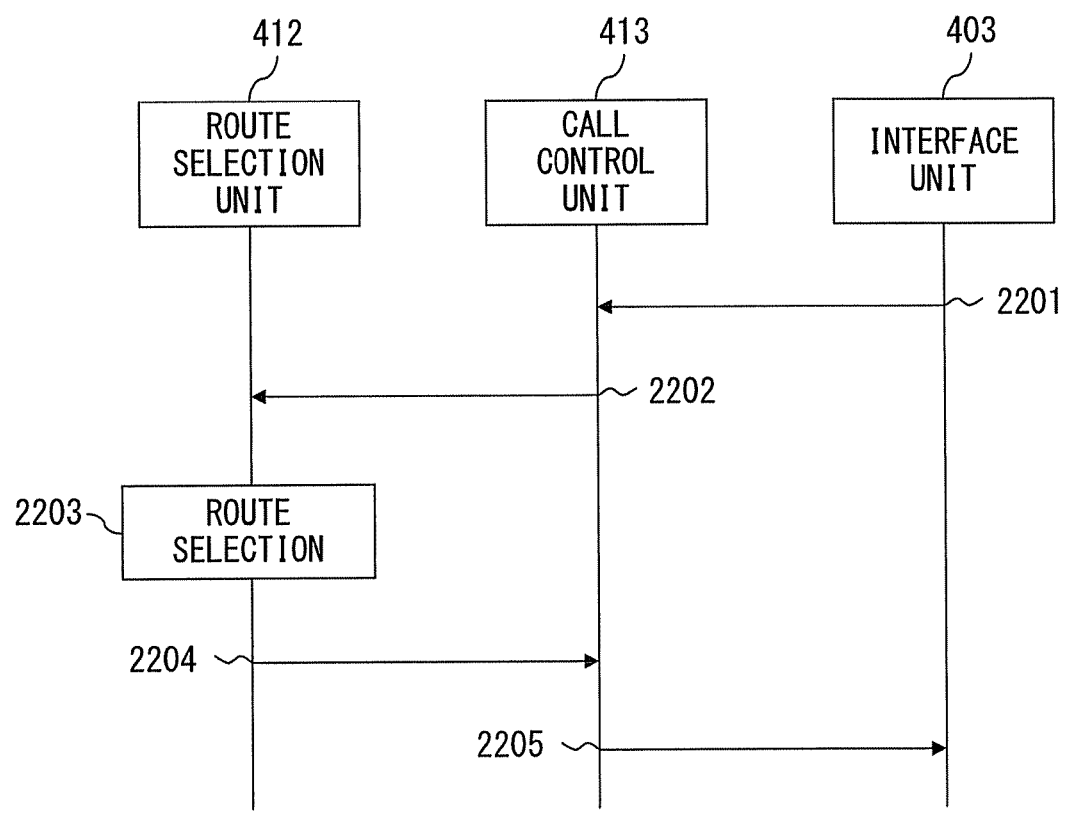
FIG. 22 illustrates a sequence of a route selection process by an IP-RNC.

FIG. 22 illustrates the sequence of a route selection process performed by the IP-RNC 106 in step 1907. The interface unit 403 transfers a RB assignment request message received from the MMS 111 to the call control unit 413 (step 2201) and the call control unit 413 transmits a route selection request to the route selection unit 412 (step 2202).

The route selection unit 412 selects either the public or corporate network according to the above-described route selection algorithm (step 2203) and transmits a route selection response indicating the selection result to the call control unit 413 (step 2204). The call control unit 413 transfers a line setting request including the type of the selected route to the interface unit 403 (step 2205) and the interface unit 403 transmits the line setting request to the extension server 143.

Figure 23:
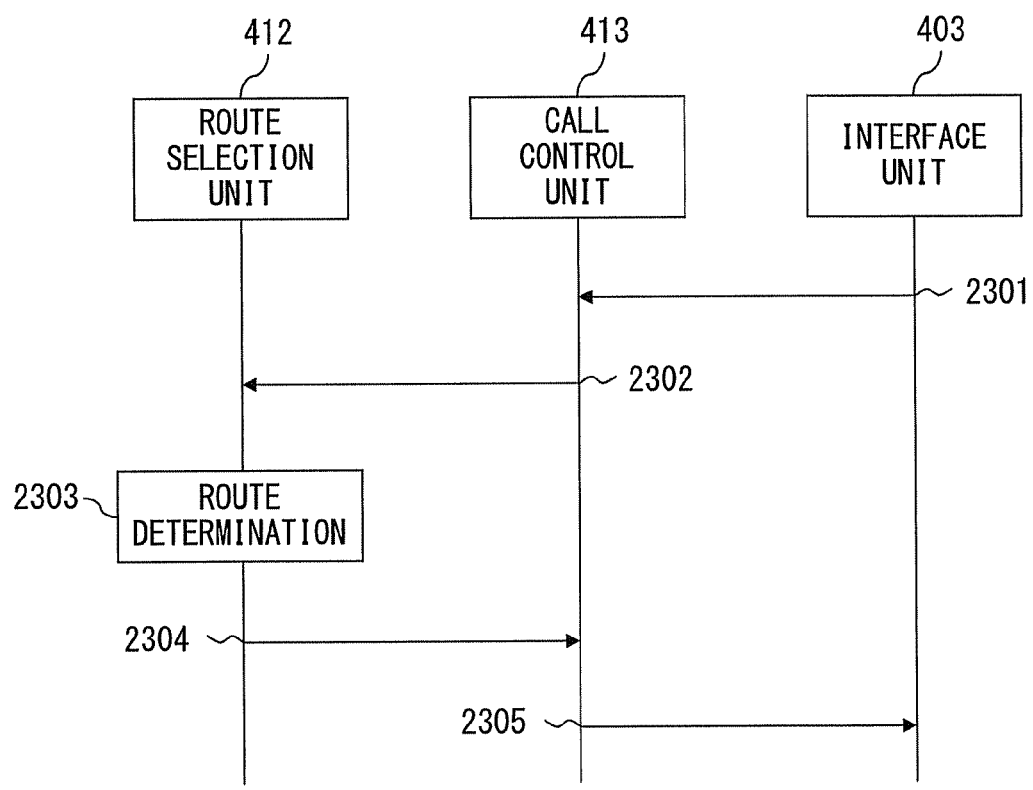
FIG. 23 illustrates a sequence of a route determination process by an IP-RNC.

FIG. 23 illustrates the sequence of a route determination process performed by the IP-RNC 106 in step 2005. The interface unit 403 transfers an extension server connection destination change request received from the MMS 111 to the call control unit 413 (step 2301) and the call control unit 413 transmits a route determination request to the route selection unit 412 (step 2302).

The route selection unit 412 determines whether the route selected on the called side coincides with the route selected on the calling side (step 2303). If those routes are the same, it transmits a route determination response indicating the type of the route selected on the called side to the call control unit 413 (step 2304). If those routes are different, it re-selects either the public or corporate network according to the above-described route selection algorithm and transmits a route determination response indicating the selection result to the call control unit 413.

The call control unit 413 transfers a connection destination change request including the type of the route indicated by the route determination response to the interface unit 403 (step 2305) and the interface unit 403 transmits the connection destination change request to the extension server 143.

Figure 25:
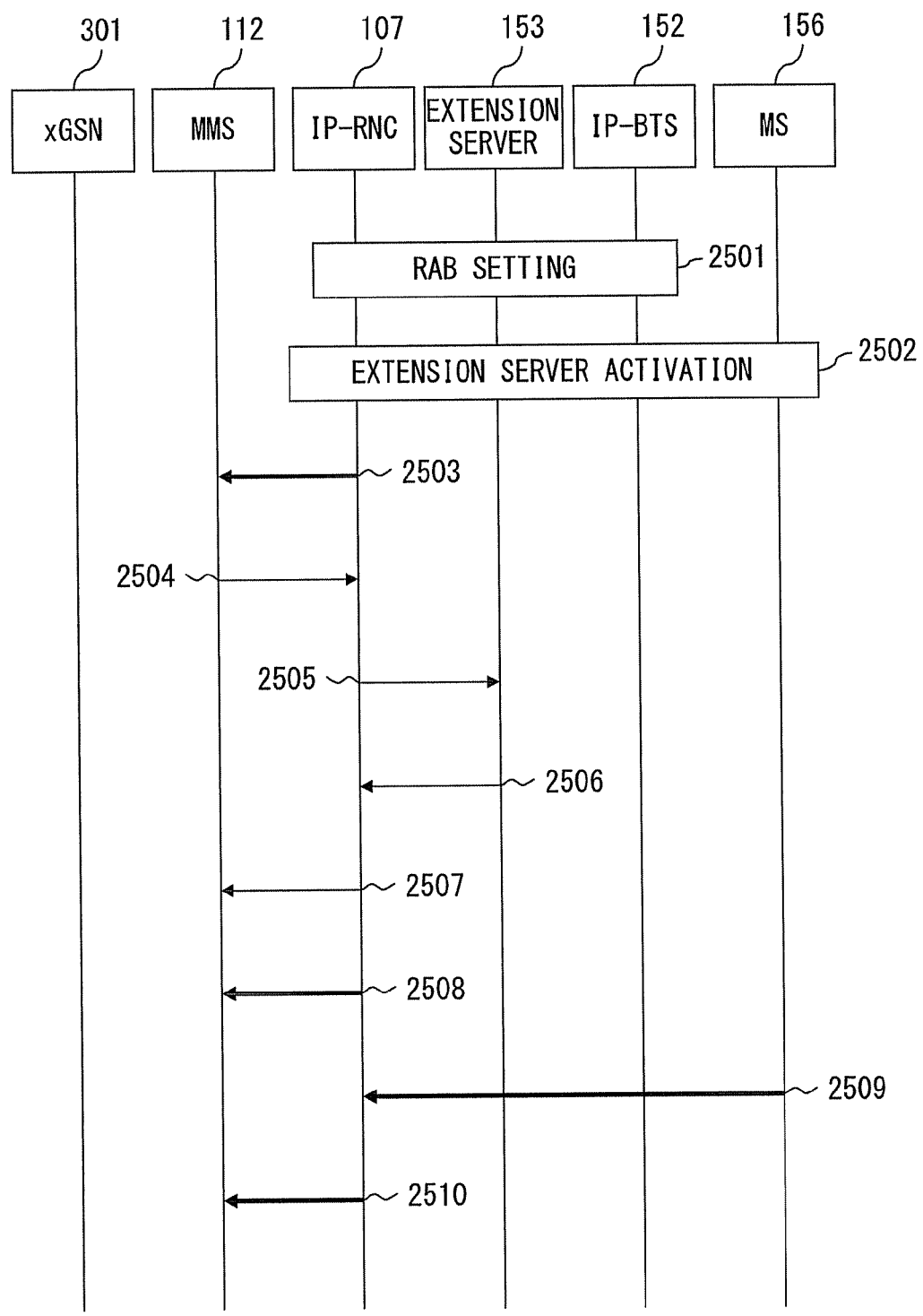
FIG. 25 illustrates a connection sequence on an extension connection called side in the case where an IP-RNC selects a route (No. 2)
Figure 26:
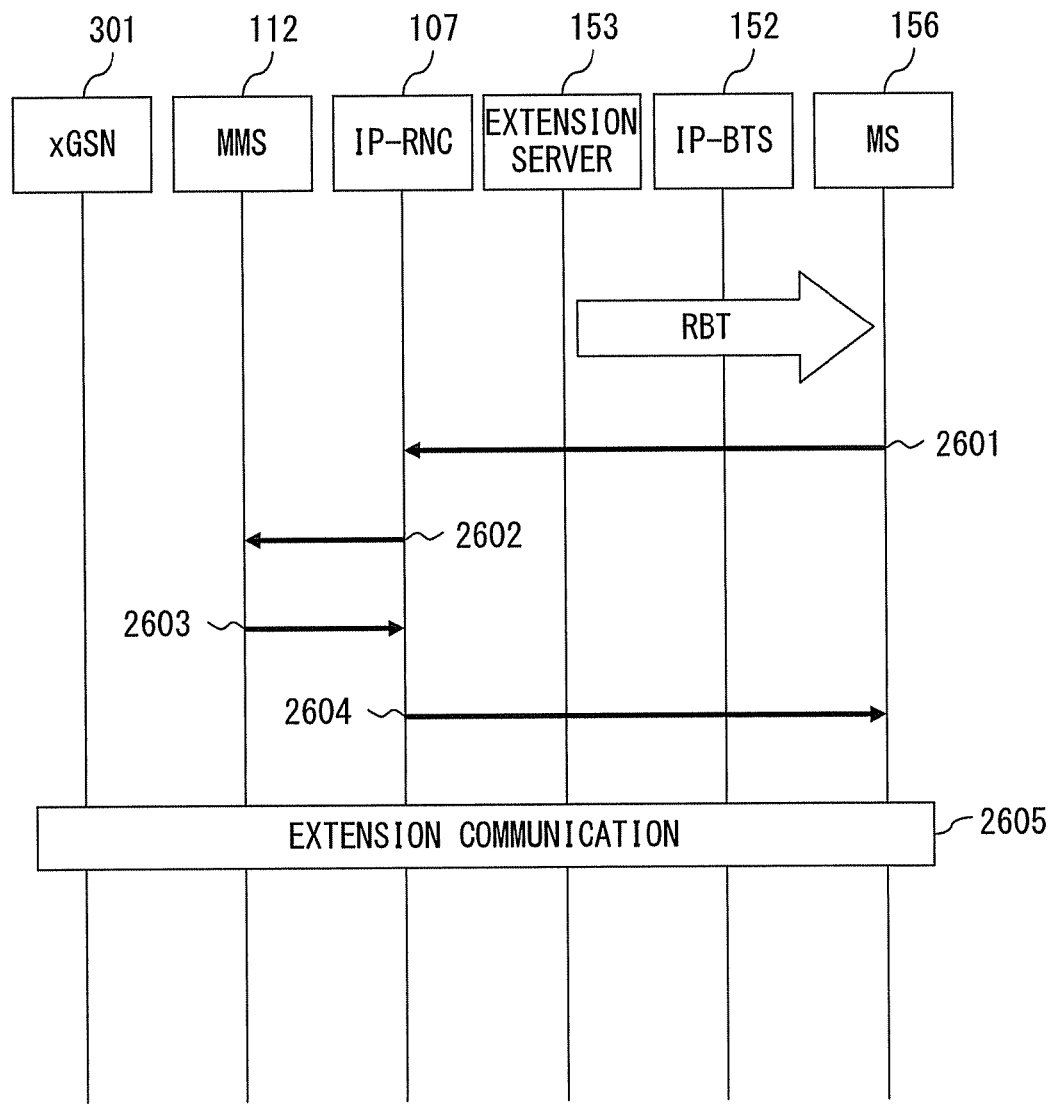
FIG. 26 illustrates a connection sequence on an extension connection called side in the case where an IP-RNC selects a route (No. 3)

FIGS. 24 through 26 illustrate a connection sequence on the called side. Firstly, the MMS 112 transmits a paging message of RANAP to the IP-RNC 107 and calls up a called party (step 2401). The IP-RNC 107 transmits the following paging type1 message of RRC to the MS 156 (step 2402).

RRC:PAGING TYPE1(PCH:PCCH, TM)

Then, RRC is set between the IP-RNC 107 and the MS 156 (step 2403). Then, a session is established between the MMS 112 and the MS 156 (step 2404) and authentication, concealing and position control processes are performed (step 2405).

Then, the MMS 112 transmits the following direct transfer message of RANAP to the IP-RNC 107 and performs an extension called-side process (step 2406).

RANAP:DIRECT TRANSFER(CC:SETUP)

Then, the IP-RNC 107 transmits the following downlink direct transfer message of RRC to the MS 156 (step 2407).

RRC:DOWNLINK DIRECT TRANSFER(CC:SETUP)

Then, the MS 156 transmits the following uplink direct transfer message of RRC to the IP-RNC 107 (step 2408).

RRC:UPLINK DIRECT TRANSFER(CC:CALL CONFIRM)

Then, the IP-RNC 107 transmits the following direct transfer message of RANAP to the MMS 112 (step 2409).

RANAP:DIRECT TRANSFER(CC:CALL CONFIRM)

Then, the MMS 112 transmits the RAB assignment request message of RANAP to the IP-RNC 107 (step 2410). This message includes the complete location IDs on both the calling and called sides, the type of the route selected on the calling side and both the IP address and UDP port number of the calling-side extension server 143 corresponding to the type. These pieces of information are obtained from the network-side connection information report transmitted in step 1910.

Upon receipt of the RAB assignment request message, the IP-RNC 107 selects either the public or corporate network as a connection route (step 2411) and notifies the extension server 153 of the type of either the public or corporate network by a line setting request (step 2412). The route selection process in step 2411 is the same as the route selection process on the calling side illustrated in FIG. 22.

Since there is a possibility that the elements and conditions of the above-described various types of route selection algorithms change as time elapses, the route selected on the called side does not always coincide with the route selected on the calling side. Therefore, it can happen that while the public network is selected on the calling side, the corporate network is selected on the called side. Therefore, the information of the route selected on the called side is reported to the calling side for confirmation.

The extension server 153 transmits a line setting response to the IP-RNC 107 (step 2413) and the IP-RNC 107 transmits a network-side connection information report to the MMS 112 (step 2414). The line setting response and the network-side connection information report include the type of the route reported from the IP-RNC 107 and both the IP address and UDP port number of the called-side extension server 153, corresponding to the type. The network-side connection information report is transferred from the MMS 112 to MMS 111.

Then, an RAB is set between the IP-BTS 152 and the IP-RNC 107 (step 2501) and an extension server activation process is performed between the MS 156 and the IP-RNC 107 (step 2502). Then, the IP-RNC 107 transmits the RAB assignment response message of RANAP to the MMS 112.

When receiving the network-side connection information report on the calling side transmitted in step 2008 from the MMS 111, the MMS 112 transmits an extension server connection destination change request to the IP-RNC 107 (step 2504). The extension server connection destination change request includes the type of the route re-selected on the calling side and both the IP address and UDP port number of the calling-side extension server 143, corresponding to the type as well as the complete location IDs on both the calling and called sides.

The IP-RNC 107 notifies the extension server 153 of the type of the route re-selected on the calling side by a connection destination change request (step 2505). The connection destination change request includes the type of the route re-selected on the calling side and both the IP address and UDP port number of the calling-side extension server 143, corresponding to the type.

The extension server 153 transmits a connection destination change response to the IP-RNC 107 (step 2506). Then, the IP-RNC 107 transmits a network-side connection information report to the MMS 112 (step 2507) and then an extension server connection destination change response to the MMS 112 (step 2508).

When the route re-selection is not performed on the calling side, steps 2504 through 2508 are omitted.

Then, the MS 156 transmits the following uplink direct transfer message of RRC to the IP-RNC 107 (step 2509).

RRC:UPLINK DIRECT TRANSFER(CC:ALTERING (DCH:DCCH, AM))

Then, the IP-RNC 107 transmits the following direct transfer message of RANAP to the MMS 112 (step 2510).

RANAP:DIRECT TRANSFER(CC:ALERTING)

Thus, an RBT is transmitted from the extension server 153 to the MS 156.

Then, the MS 156 transmits the following uplink direct transfer message of RRC to the IP-RNC 107 (step 2601).

RRC:UPLINK DIRECT BTRANSFER(CC:CONNECT (DCH:DCCH, AM))

Then, the IP-RNC 107 transmits the following direct transfer message of RANAP to the MMS 112 (step 2602).

RANAP:DIRECT TRANSFER(CC:CONNECT)

Then, the MMS 112 transmits the following direct transfer message of RANAP to the IP-RNC 107 (step 2603).

RANAP:DIRECT TRANSFER(CC:CONNECT ACKNOWLEDGE)

Then, the IP-RNC 107 transmits the following downlink direct transfer message of RRC to the MS 156 (step 2604).

RRC:DOWNLINK DIRECT TRANSFER(CC:CONNECT ACKNOWLEDGE (DCH:DCCH, AM))

Then, the MS 156 conducts an extension communication with the calling-side MS 146 (step 2605).

Next, an example of the connection sequence in the case where the extension servers 143 and 153 select a route instead of the IP-RNCs 106 and 107 will be explained with reference to FIGS. 27 through 34.

Figure 28:
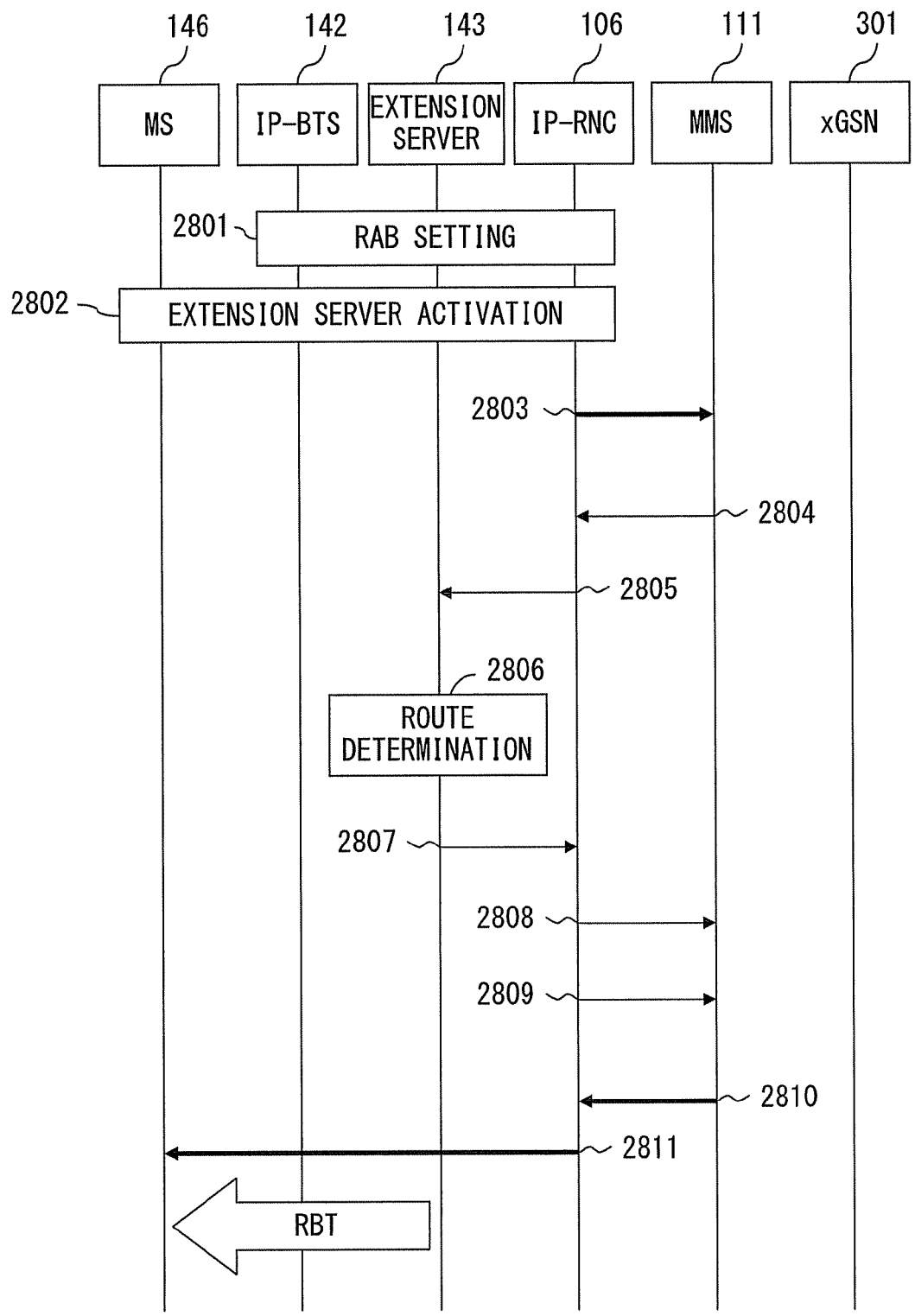
FIG. 28 illustrates a connection sequence on an extension connection calling side in the case where an extension server selects a route (No. 2)

FIGS. 27 through 29 illustrate a connection sequence on the calling side. Steps 2701 through 2706, 2710 through 2804, 2808 through 2811 and 2901 through 2905 are same as steps 1901 through 1906, 1910, 2001 through 2004, 2008 through 2011 and 2101 through 2105, respectively.

When receiving an RAE assignment request message in step 2706, the IP-RNC 106 transmits a line setting request to the extension server 143 (step 2707).

The extension server 143 selects either the public or corporate network as a connection route (step 2708) and transmits a line setting response to the IP-RNC 106 (step 2709). The line setting response includes the type of the selected route and both the IP address and UDP port number of the calling-side extension server 143, corresponding to the type.

When receiving an extension server connection destination change request in step 2804, the IP-RNC 106 notifies the extension server 143 of the type of the route selected on the called side by a connection destination change request (step 2805).

The extension server 143 determines whether the route selected on the called side coincides with the route selected on the calling side (step 2806). If those routes are different, it re-selects a route by performing the same process as in step 2708 and if the same route as the route selected on the called side cannot be selected, it performs a disconnection process.

Then, the extension server 143 transmits a connection destination change response to the IP-RNC 106 (step 2807). If a route is re-selected, the connection destination change response includes the type of the re-selected route and both the IP address and UDP port number of the calling-side extension server 143, corresponding to the type.

FIG. 30 illustrates the sequence of a route selection process performed by the extension server 143 in step 2708. The interface unit 504 transfers a line setting request received from the IP-RNC 106 to the call control unit 513 (step 3001) and the call control unit 513 transmits a route selection request to the route selection unit 511 (step 3002).

The route selection unit 511 selects either the public or corporate network according to the above-described route selection algorithm (step 3003) and transmits a route selection response indicating the selection result to the call control unit 513 (step 3004). The call control unit 513 transfers a line setting request including the type of the selected route to the interface unit 504 (step 3005) and the interface unit 504 transmits a line setting response to the IP-RNC 106.

FIG. 31 illustrates the sequence of a route determination process performed by the extension server 143 in step 2806. The interface unit 504 transfers a connection destination change request received from the IP-RNC 106 to the call control unit 413 (step 3101) and the call control unit 513 transmits a route determination request to the route selection unit 511 (step 3102).

The route selection unit 511 determines whether the route selected on the called side coincides with the route selected on the calling side (step 3103). If those routes are the same, it transmits a route determination response indicating the type of the route selected on the called side to the call control unit 513 (step 3104).

If those routes are different, it re-selects either the public or corporate network according to the above-described route selection algorithm and transmits a route determination response indicating the selection result to the call control unit 513. In this case, the route determination response includes the type of the re-selected route and both the IP address and UDP port number of the calling-side extension server 143, corresponding to the type.

The call control unit 513 transfers a connection destination change response including the type of the route indicated by the route determination response to the interface unit 504 (step 3105) and the interface unit 504 transmits the connection destination change response to the IP-RNC 106.

FIGS. 32 through 34 illustrate the connection sequence on the called side. Steps 3201 through 3210, 3214, 3301 through 3310, and 3401 through 3405 are the same as steps 2401 through 2410, 2414, 2501 through 2510 and 2601 through 2605, respectively.

When receiving an RAB assignment request message in step 3210, the IP-RNC 107 transmits a line setting request to the extension server 153 (step 3211).

The extension server 153 selects either the public or corporate network as a connection route (step 3212) and transmits a line setting response to the IP-RNC 107 (step 3213). The route selection process in step 3212 is the same as the route selection process on the calling side illustrated in FIG. 30. The line setting response includes the type of a selected route and both the IP address and UDP port number of the called-side extension server 153, corresponding to the type.

As described above, if two extension connection routes selected on the calling and called sides, respectively, are the same, an extension connection is established using the extension connection route. Therefore, an extension connection can be established while a selected extension connection route is being checked.

Next, an example of the connection sequence in the case where the MS 146 at location 104 establishes a PS extension connection with the corporate network 103 will be explained with reference to FIGS. 35 and 36. In this example, it is assumed that application having a VPN function is mounted on the MS 146.

FIG. 35 illustrates the connection sequence of a PS extension connection. Firstly, RRC is set between the MS 146 and the xGSN 301 (step 3501). Then, a session is established between the MS 146 and the xGSN 301 (step 3502) and authentication, concealing and position control processes are performed between the MS 146 and the MMS 111 (step 3503).

Then, the MS 146 transmits the following uplink direct transfer message of the RRC to the IP-RNC 106 and notifies it of a connection destination network address (step 3504).

RRC:UPLINK DIRECT TRANSFER(SM:ACTIVATE PDF CONTEXT REQUEST(DCH, DCCH, AM))

This message describes, for example, the address of the VPN server 303 illustrated in FIG. 3 as a connection destination network address.

Then, the IP-RNC 106 transmits the following direct transfer message of the RANAP to the xGSN 301 (step 3505).

RANAP:DIRECT TRANSFER(SM:ACTIVATE PDP CONTEXT REQUEST)

Upon receipt of the direct transfer message, the xGSN 301 determines whether an extension connection is possible (step 3506) and transmits the RAB assignment request message of the RANAP indicating the determination result to the IP-RNC 106 (step 3507). If an extension connection is possible, this message describes an extension connection.

Then, the IP-RNC 106 instructs the extension server 143 to establish a PS extension connection and notifies it of the address of the VPN server 303 (step 3508). Then, it performs a VP tunneling process between the MS 146 and the extension server 143 and establishes a VP tunnel 333 between the MS 146 and the corporate network 103 (step 3509).

Then, the extension server 143 transmits a line setting response to the IP-RNC 106 (step 3510) and the IP-RNC 106 transmits a network-side connection information report to the xGSN 301 (step 3511). Each of the line setting response and the network-side connection information report includes both the IP address and UDP port number of the extension server 143.

Then, an RAB is set between the IP-BTS 142 and the IP-RNC 106 (step 3512) and an extension server activation process is performed between the MS 146 and the IP-RNC 106 (step 3513). Then, the IP-RNC 106 transmits the RAB assignment response message of the RANAP to the xGSN 301 (step 3514).

Then, the xGSN 301 transmits the following direct transfer message of the RANAP to the IP-RNC 106 (step 3515).
RANAP:DIRECT TRANSFER(SM:ACTIVATE PDP CONTEXT ACCEPT)

Then, the IP-RNC 106 transmits the following downlink direct transfer message of the RRC to the MS 146 (step 3516).
RRC:DOWNLINK DIRECT TRANSFER(SM:ACTIVATE PDP CONTEXT ACCEPT(DCH:DCCH, AM))

Then, the MS 146 accesses the user server 321 and the like via the VP tunnel 333 and conducts a packet communication (step 3517).

FIG. 36 illustrates the sequence of a connection possible/impossible determination process performed by the xGSN 301 in step 3506. When receiving a direct transfer message from the IP-RNC 106, the xGSN 301 firstly extracts both a connection destination network address and terminal information from the message (step 3601).

Then, it checks whether the connection destination network address exists in the extension connection address list 311 (step 3602). If the connection destination network address exists, it checks whether the MS 146 is extension-connectable (step 3603). If the MS 146 is extension-connectable, it transmits an RAB assignment request message indicating the determination result of being connectable to the IP-RNC 106 (step 3507-1).

If the connection destination network address does not exist in the extension connection address list 311 or if the MS 146 is extension-unconnectable, it transmits an RAB assignment request message indicating the determination result of being un-connectable to the IP-RNC 106 (step 3507-2).

According to such an extension connection method, a packet switching extension connection route via a virtual private network becomes usable in addition to the conventional packet switching connection route.

Next, an example of a route state monitoring sequence by an extension server will be explained with reference to FIGS. 37 through 39.

Figure 37:
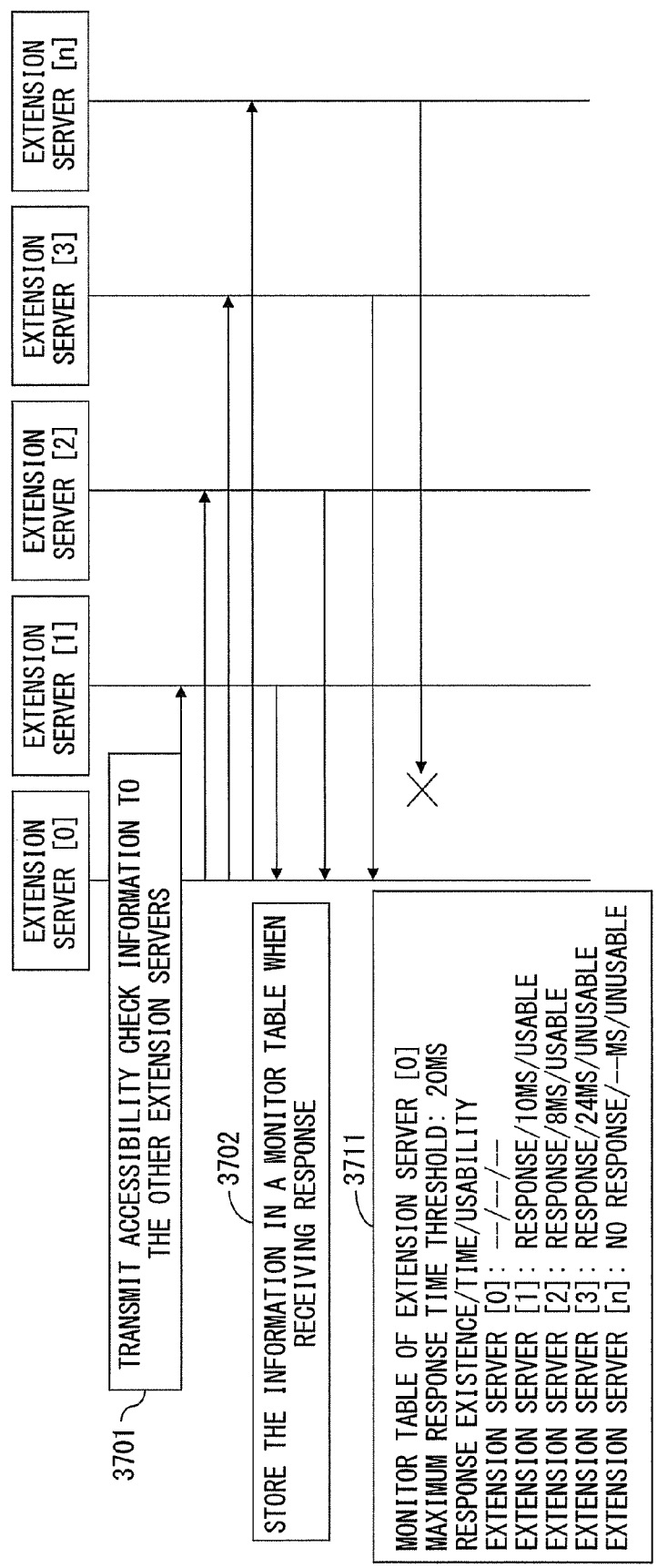
FIG. 37 illustrates a sequence of all-time monitoring.

FIG. 37 illustrates the full-time monitoring sequence in the case where extension servers [0] through [n] exist at each location of the radio communication system. In this example, it is assumed that an extension server [0] monitors a route state. This also applies to monitoring by extension servers [1] through [n].

Figure 6:
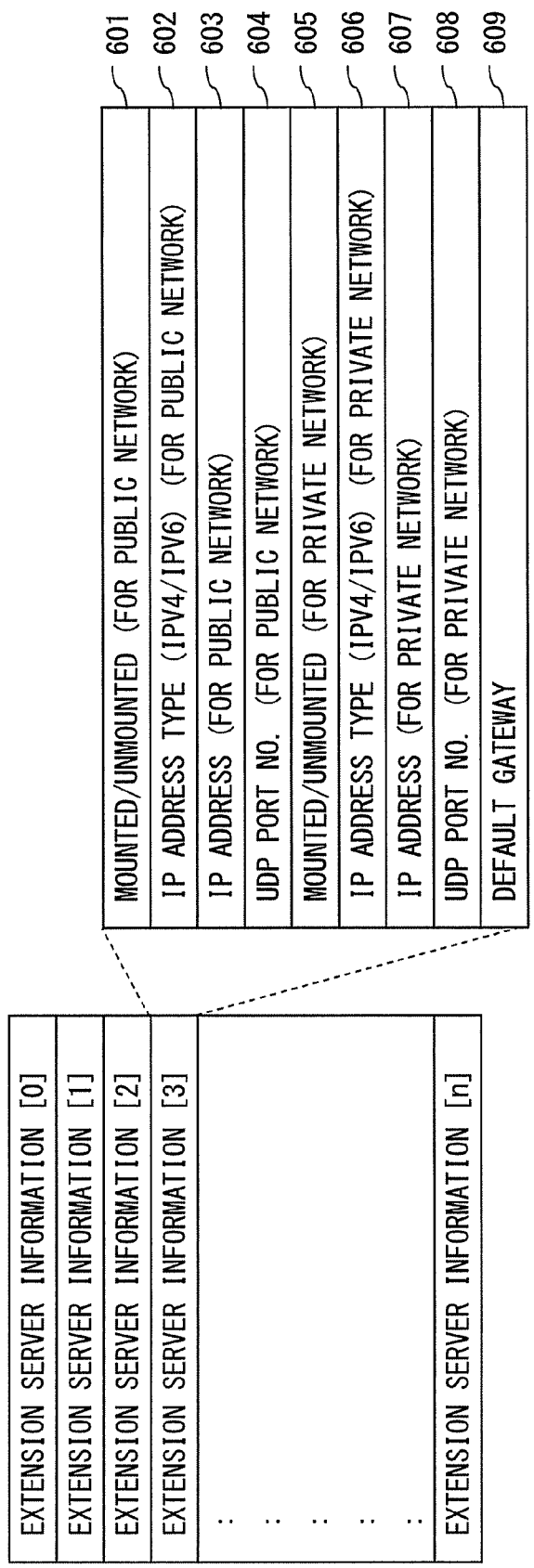
FIG. 6 illustrates route composition information.

Firstly, the extension server [0] obtains the IP addresses (for either the public or corporate network) of the other extension servers [1] through [n] from the route composition information illustrated in FIG. 6. Then, it transmits reachability check information, such as the ping of the ICMP, using each of the obtained IP addresses as an address and monitors a response from each extension server (step 3701). Then, it records the information of the existence/non-existence of a response, response time and usability/un-usability of each extension server on a monitor table 3711 (step 3702).

If there is no response, the corresponding extension server is handled as being unusable and "impossible" is written into the location information illustrated in FIGS. 7 and 9. If the maximum value of a response time exceeds a threshold value, the corresponding extension server is handled as being unusable and "impossible" is written into the location information. Thus, the conditions of the route selection algorithm are changed and the change is reflected in the future route selection result.

FIGS. 38 and 39 illustrate the sequences of a connection-time monitoring performed when an extension connection request is issued.

Step 3801 corresponds to, for example, steps 1906 through 1909 illustrated in FIG. 19 or steps 2706 through 2709 illustrated in FIG. 27. Step 3802 corresponds to, for example, step 1910 illustrated in FIG. 19 or step 2710 illustrated in FIG. 27 and step 2410 illustrated in FIG. 24 or step 3210 illustrated in FIG. 32.

Steps 3803 and 3804 correspond to, for example, steps 2411 through 2413 illustrated in FIG. 24 or steps 3211 through 3213 illustrated in FIG. 32. Step 3811 corresponds to, for example, step 2004 illustrated in FIG. 20 or step 2804 illustrated in FIG. 28 and step 2414 illustrated in FIG. 24 or step 3214 illustrated in FIG. 32.

Step 3901 corresponds to, for example, step 2008 illustrated in FIG. 20 or step 2808 illustrated in FIG. 28 and step 2414 illustrated in FIG. 24 or step 3214 illustrated in FIG. 32.

Steps 3902 and 3903, correspond to, for example, steps 2005 through 2007 illustrated in FIG. 20 or steps 2805 through 2807 illustrated in FIG. 28. Step 3910, corresponds to, for example, step 2004 illustrated in FIG. 20 or step 2804 illustrated in FIG. 28 and step 2504 illustrated in FIG. 25 or step 3304 illustrated in FIG. 33.

When receiving an RAE assignment request message in step 3802, the called-side IP-RNC 107 obtains the type of the route selected on the calling side from the message (step 3803). Then, either the IP-RNC 107 or the extension server 153 selects either the public or corporate network as a connection route and the extension server 153 determines both the IP address and UDP port number of the extension server 153 corresponding to the selected route (step 3804).

Then, the IP-RNC 107 determines whether the route selected on the called side coincides with the route selected on the calling side (step 3805). If those routes are the same, it transmits an opposed node check instruction to the extension server 153 (step 3806).

Then, the extension server 153 transmits reachability check information, such as a ping and the like, to the calling-side extension server 143 (step 3807) and receives its response from the extension server 143 (step 3808). Then, it transmits an opposed node check result to the IP-RNC 107 (step 3809).

The IP-RNC 107 determines its reachability on the basis of the opposed node check result (step 3810). If the extension server 153 has received a response from the extension server 143 within a specified time, the determination result becomes OK. If the extension server 153 has received no response or if its response time exceeds the specified time, the determination result becomes NG.

If the determination result is OK, the IP-RNC 107 transmits a network-side connection information report including the same route type as one selected on the calling side to the MMS 111 via the MMS 112 and the MMS 111 transmits an extension server connection destination change request to the IP-RNC 106 (step 3811).

If the determination result is NG, the IP-RNC 107 transmits a network-side connection information report including the different route type from one selected on the calling side to the MMS 111 via the MMS 112 and the MMS 111 transmits an extension server connection destination change request to the IP-RNC 106 (step 3901).

When the route selected on the called side in step 3805 differs from the route selected on the calling side too, steps 3901 and after are executed.

Then, the IP-RNC 106 obtains the type of the route selected on the called side from the extension server connection destination change request (step 3902). Then, either the IP-RNC 106 or the extension server 143 determines whether the route coincides with the route selected on the calling side. If those routes are different, it re-selects a route (step 3903).

Then, the IP-RNC 106 determines whether the route re-selected on the calling side coincides with the route selected on the called side (step 3904). If those routes are the same, it transmits an opposed node check instruction to the extension server 143 (step 3905).

Then, the extension server 143 transmits reachability check information to the called-side extension server 153 (step 3906) and receives its response from the extension server 153 (step 3907). Then, it transmits an opposed node check result to the IP-RNC 106 (step 3908).

The IP-RNC 107 determines its reachability on the basis of the opposed node check result (step 3909). If the determination result is OK, the IP-RNC 106 transmits a network-side connection information report including the same route type as one selected on the called side to the MMS 112 via the MMS 111 and the MMS 112 transmits an extension server connection destination change request to the IP-RNC 107 (step 3910).

If the determination result is NG, the IP-RNC 106 transmits an extension connection notice indicating the connection failure to the called-side IP-RNC 107 (step 3911). Then, either a retry process or a call release step is executed between the calling and called sides (step 3912).

When the route re-selected on the calling side in step 3904 differs from the route selected on the called side too, steps 3911 and after are executed.

The IP-RNCs 106 and 107 and extension servers 143 and 153 illustrated in FIG. 1 can be composed, for example, using an information processing device (computer) as illustrated in FIG. 40. The information processing device illustrated in FIG. 40 includes a central processing unit (CPU) 4001, a memory 4002, an external storage device 4003 and a network connection device 4004, which are all connected by a bus 4005.

The memory 4002 stores a program to be used for a process and data, such as route composition information, location information, subscriber class information, service type information and the like. The CPU 4001 performs the processes of the IP-RNCs 106 and 107 and the extension servers 143 and 153 by executing the program using the memory 4002.

The external storage device 2405 is, for example, a magnetic disk device, an optical disk device, a magneto-optical disk device, a tape device or the like. The information processing device stores its program and data in this external storage device 4003 in advance and uses them loading them onto the memory 4002.

The network connection device 4004 is connected to a communication network and converts data accompanying communications. The IP-RNCs 106 and 107 communicate with the BGWs 108 and 109 via the network connection device 4004 and the extension servers 143 and 153 communicate with the BGWs 141 and 151 via the network connection device 4004.

According to the preferred embodiment explained so far, the connection route of an extension connection service between mobile terminals can be selected from among a plurality of routes. Furthermore, a mobile terminal can access packet information by an extension connection.

Although in the above-described preferred embodiments, an extension connection route is selected from two routes of an IP router network and a corporate network, an extension connection route may be similarly selected from three or more routes.

Furthermore, the various sequences illustrated in FIGS. 19 through 39 are only examples and part of procedures may be omitted, modified or added appropriately, according to the configuration and specification of the radio communication system.

Furthermore, the various route selection algorithms illustrated in FIGS. 7 through 18 are only examples, and an extension connection route may also be selected by another algorithm.

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An extension connection method for establishing an extension connection between a first mobile terminal and a second mobile terminal, the extension connection method comprising:

transmitting an extension connection request for an extension call placed from the first mobile terminal to the second mobile terminal, from the first mobile terminal to a first route selection device;

selecting a first extension connection route from among a plurality of extension connection routes for an extension call between the first mobile terminal and the second mobile terminal;

transmitting a type of the first extension connection route and calling-side address information used on the first extension connection route from the first route selection device to a second route selection device;

selecting a second extension connection route from among the plurality of extension connection routes for the extension call between the first mobile terminal and the second mobile terminal;

transmitting a type of the second extension connection route and called-side address information used on the second extension connection route from the second route selection device to the first route selection device; and determining whether the second extension connection route coincides with the first extension connection route;

wherein when the second extension connection route coincides with the first extension connection route, establishing the extension connection between the first mobile terminal and the second mobile terminal via the first extension connection route.

2. The extension connection method according to claim 1, further comprising:
when the second extension connection route does not coincide with the first extension connection route, selecting a third extension connection route from among the plurality of extension connection routes and determining whether the third extension connection route coincides with the second extension connection route; and
when the third extension connection route coincides with the second extension connection route, establishing the extension connection between the first mobile terminal and the second mobile terminal via the second extension connection route.

3. The extension connection method according to claim 1, wherein the selecting the first extension connection route includes:
transmitting reachability check information from the first route selection device to the second route selection device via each of the plurality of extension connection routes and checking whether the first route selection device receives a response from the second route selection device; and
selecting an extension connection route which receives the response, of the plurality of extension connection routes as the first extension connection route.

4. The extension connection method according to claim 1, wherein the transmitting the type of the second extension connection route and the called-side address information includes:
determining whether the second extension connection route coincides with the first extension connection route;
transmitting reachability check information from the second route selection device to the first route selection device via the second extension connection route when the second extension connection route coincides with the first extension connection route; and
transmitting the type of the second extension connection route and the called-side address information used on the second extension connection route from the second route selection device to the first route selection device when the second route selection device receives a response from the first route selection device.

5. A route selection device, comprising:
a first receiving unit embodied in hardware and configured to receive an extension connection request for an extension call placed from a first mobile terminal to a second mobile terminal, from the first mobile terminal;
a selection unit embodied in hardware and configured to select a first extension connection route from among a plurality of extension connection routes for an extension call between the first mobile terminal and the second mobile terminal when receiving the extension connection request;
a transmitting unit embodied in hardware and configured to transmit a type of the first extension connection route and calling-side address information used on the first extension connection route to a called-side route selection device;
a second receiving unit embodied in hardware and configured to receive a type of a second extension connection route selected from among the plurality of extension connection routes for the extension call between the first mobile terminal and the second mobile terminal and called-side address information used on the second extension connection route from the called-side route selection device;
a determination unit embodied in hardware and configured to determine whether the second extension connection route coincides with the first extension connection route; and
a connection unit embodied in hardware and configured to establish an extension connection for the extension call placed from the first mobile terminal to the second mobile terminal via the first extension connection route when the second extension connection route coincides with the first extension connection route.

6. An extension connection method for establishing a packet switching extension connection between a first mobile terminal and a target server device having packet information, the extension connection method comprising:
transmitting connection destination network address information of a virtual private network server device for connecting the first mobile terminal to a network to which the target server device belongs, from the first mobile terminal to an extension connection determination device;
checking whether an address indicated by the connection destination network address information exists in an extension connection address list for an extension call placed from the first mobile terminal to a second mobile terminal;
instructing an extension server device that establishes an extension connection for the extension call placed from the first mobile terminal to the second mobile terminal, to establish a packet switching extension connection when the address exists in the extension connection address list;
establishing an route connection between the first mobile terminal and the virtual private network server device; and
establishing a packet switching extension connection between the first mobile terminal and the target server device via the virtual private network server device.

* * * * *